United States Patent
Davey et al.

(10) Patent No.: US 12,204,350 B1
(45) Date of Patent: Jan. 21, 2025

(54) AUTONOMOUS ROBOT DOUBLE DRIVE ASSEMBLY

(71) Applicant: Robust AI, Inc., San Carlos, CA (US)

(72) Inventors: Jay Davey, Kangaroo Flat (AU); Mark Yim, Wayne, PA (US); Jamie Luong, San Mateo, CA (US); Heather Klaubert, San Jose, CA (US); Justine Rembisz, San Carlos, CA (US); Benjie Holson, San Carlos, CA (US)

(73) Assignee: Robust AI, Inc., San Carlos, CA (US)

( * ) Notice: Subject to any disclaimer, the term of this patent is extended or adjusted under 35 U.S.C. 154(b) by 0 days.

(21) Appl. No.: 18/622,640

(22) Filed: Mar. 29, 2024

Related U.S. Application Data

(60) Provisional application No. 63/561,023, filed on Mar. 4, 2024.

(51) Int. Cl.
*G05D 1/656* (2024.01)
*G05D 1/24* (2024.01)
(Continued)

(52) U.S. Cl.
CPC .............. *G05D 1/656* (2024.01); *G05D 1/24* (2024.01); *G05D 2105/20* (2024.01); *G05D 2107/70* (2024.01); *G05D 2111/50* (2024.01)

(58) Field of Classification Search
CPC .......... B65G 1/02; B66F 9/063; B66F 9/0755; B66F 9/065; B66F 9/19; B66F 9/07522; B66F 9/22; B66F 9/24; B66F 9/18; B66F 7/08; G05D 1/656; G05D 1/24; G05D 2105/20; G05D 2107/70; G05D 2111/50; G05D 1/021; G05D 1/60
See application file for complete search history.

(56) References Cited

U.S. PATENT DOCUMENTS

| 4,028,135 A | 6/1977 | Vig |
| 6,408,230 B2 * | 6/2002 | Wada .................. G05D 1/0272 |
| | | 701/1 |

(Continued)

FOREIGN PATENT DOCUMENTS

| JP | 2021175631 | 11/2021 |
| WO | 2018233853 A1 | 12/2018 |
| WO | 2018233858 A1 | 12/2018 |

OTHER PUBLICATIONS

Costa et al., "Designing for Uniform Mobility Using Holonomicity," 2017 IEEE International Conference on Robotics and Automation (ICRA) Singapore, May 29-Jun. 3, 2017.

(Continued)

*Primary Examiner* — Jason Holloway
*Assistant Examiner* — Blake A Wood
(74) *Attorney, Agent, or Firm* — Polygon IP, LLP

(57) ABSTRACT

An autonomous robot drive assembly includes a plurality of drive units. The plurality of drive units may allow for movement and control of the autonomous robot drive. Each of the plurality of drive units are configured to be oriented independent of the other drive units. Each drive unit may include a plurality of independently operable driven wheels. Each drive unit may further include a drive unit coupling, allowing for the drive unit to rotate independently of other portions of the autonomous robot. The drive unit coupling may not be driven and may be configured to freely rotate.

20 Claims, 13 Drawing Sheets

(51) Int. Cl.
    *G05D 105/20*      (2024.01)
    *G05D 107/70*      (2024.01)
    *G05D 111/50*      (2024.01)

(56) References Cited

U.S. PATENT DOCUMENTS

| | | | |
|---|---|---|---|
| 6,853,877 B1 * | 2/2005 | Slater | G05D 1/0272 |
| | | | 701/41 |
| 6,865,446 B2 | 3/2005 | Yokono | |
| 6,925,679 B2 | 8/2005 | Wallach | |
| 8,428,781 B2 | 4/2013 | Chang | |
| 8,909,370 B2 | 12/2014 | Stiehl | |
| 9,757,486 B2 | 9/2017 | Dobrinsky | |
| 10,279,476 B2 | 5/2019 | Jaekel | |
| 10,793,291 B2 | 10/2020 | Brown | |
| 10,919,555 B1 | 2/2021 | Spruill | |
| 11,099,562 B1 | 8/2021 | Ebrahimi Afrouzi | |
| 11,548,159 B1 | 1/2023 | Ebrahimi Afrouzi | |
| 11,858,573 B2 * | 1/2024 | Lee | B60K 17/30 |
| 2007/0080000 A1 * | 4/2007 | Tobey | B60B 27/0047 |
| | | | 180/21 |
| 2008/0106374 A1 | 5/2008 | Sharbaugh | |
| 2008/0197226 A1 | 8/2008 | Cooper | |
| 2010/0234993 A1 | 9/2010 | Seelinger | |
| 2012/0305787 A1 | 12/2012 | Henson | |
| 2013/0008734 A1 * | 1/2013 | Swasey | B60K 17/30 |
| | | | 180/55 |
| 2015/0088310 A1 | 3/2015 | Pinter | |
| 2015/0125252 A1 * | 5/2015 | Berzen Ratzel | B62D 12/02 |
| | | | 414/800 |
| 2016/0271803 A1 | 9/2016 | Stewart | |
| 2016/0317690 A1 | 11/2016 | Dayton | |
| 2016/0354931 A1 | 12/2016 | Jones | |
| 2017/0001656 A1 | 1/2017 | Katayama | |
| 2017/0049915 A1 | 2/2017 | Brais | |
| 2017/0080117 A1 | 3/2017 | Gordon | |
| 2017/0097232 A1 | 4/2017 | Anderson-Sprecher | |
| 2017/0246331 A1 | 8/2017 | Lloyd | |
| 2018/0001946 A1 | 1/2018 | Yokoya | |
| 2018/0101179 A1 | 4/2018 | Louey | |
| 2018/0104368 A1 | 4/2018 | Dobrinsky | |
| 2018/0116479 A1 | 5/2018 | Gilbert, Jr. | |
| 2018/0161986 A1 | 6/2018 | Kee | |
| 2018/0354539 A1 | 12/2018 | Casey | |
| 2019/0217477 A1 | 7/2019 | Paepcke | |
| 2019/0219409 A1 | 7/2019 | Tan | |
| 2019/0224853 A1 | 7/2019 | Gewecke | |
| 2019/0270375 A1 * | 9/2019 | Newell | B62D 63/04 |
| 2020/0086487 A1 | 3/2020 | Johnson | |
| 2020/0094418 A1 | 3/2020 | Mika | |
| 2020/0148520 A1 * | 5/2020 | Luo | B66F 9/24 |
| 2020/0164737 A1 * | 5/2020 | Kozlenok | B62D 63/025 |
| 2020/0189120 A1 | 6/2020 | Weaver | |
| 2020/0401133 A1 | 12/2020 | Armbrust | |
| 2021/0053207 A1 | 2/2021 | Romanov | |
| 2021/0138912 A1 | 5/2021 | Yamasaki | |
| 2021/0155464 A1 | 5/2021 | Takai | |
| 2021/0178001 A1 | 6/2021 | Bonutti | |
| 2021/0179403 A1 * | 6/2021 | Nakamura | B25J 9/1633 |
| 2021/0259497 A1 | 8/2021 | Park | |
| 2021/0379952 A1 * | 12/2021 | Zhou | B66F 9/07586 |
| 2022/0088237 A1 | 3/2022 | Hauser | |
| 2022/0194763 A1 * | 6/2022 | Canuto Gil | B66F 9/063 |
| 2023/0050980 A1 | 2/2023 | Zahdeh | |
| 2023/0101404 A1 * | 3/2023 | Lee | B66F 9/07572 |
| | | | 254/2 C |
| 2023/0191589 A1 * | 6/2023 | Lee | B66F 9/205 |
| | | | 414/373 |
| 2024/0004391 A1 * | 1/2024 | Galluzzo | B65G 1/1373 |

OTHER PUBLICATIONS

Huang, Feixiang; Robotic Delivery System for Material Handling [Master's Thesis, University of Akron], Dec. 2014.
Jones et al., "Design and Evaluation of Magnetic Hall Effect Tactile Sensors for Use in Sensorized Splints," Sensors, Feb. 19, 2020, 20, 1123.
Int'l Application Serial No. PCT/US21/24416, Int'l Search Report and Written Opinion mailed Jun. 10, 2021.
Int'l Application Serial No. PCT/US22/79883 Int'l Search Report and Written Opinion mailed Feb. 3, 2023.
Mobile Autonomous Robotic Cart 3 Series Overview, 3 Series Data Sheet v220301A, retrieved on Jul. 22, 2022, https://www.multechnologies.com/hubfs/manuals/MARC_3_Series_data_sheet_2203a.pdf.
Nasab et al., "Design and development of a multi-axis force sensor based on the hall effect with decouple structure," Mechatronics, vol. 84, Jun. 2022.
Nie et al., "A Soft Four Degree-of-Freedom Load Cell Based on the Hall Effect," IEEE Sensors Journal, vol. 17, No. 22, Nov. 15, 2017.
Office Action (Non-Final Rejection) dated Feb. 10, 2023 for U.S. Appl. No. 17/207,195 (pp. 1-18).
Office Action (Non-Final Rejection) dated Sep. 14, 2023 for U.S. Appl. No. 17/207,204 (pp. 1-21).
Office Action (Non-Final Rejection) dated Sep. 28, 2023 for U.S. Appl. No. 17/208,672 (pp. 1-15).
Office Action (Non-Final Rejection) dated Dec. 19, 2023 for U.S. Appl. No. 17/538,668 (pp. 1-31).
Office Action (Notice of Allowance and Fees Due (PTOL-85)) dated Mar. 4, 2024 for U.S. Appl. No. 17/208,672 (pp. 1-9).
Office Action (Notice of Allowance and Fees Due (PTOL-85)) dated Jun. 12, 2023 for U.S. Appl. No. 17/207,195 (pp. 1-8).
Office Action (Notice of Allowance and Fees Due (PTOL-85)) dated Jul. 2, 2024 for U.S. Appl. No. 17/538,668 (pp. 1-8).
Rakovic et al., "3-Axis Contact Force Fingertip Sensor Based on Hall Effect Sensor," Advances in Robot Design and Intelligent Control. RAAD, Nov. 2016.
Scholz, Jonathan et al; Cart Pushing with a Mobile Manipulation System: Towards Navigation with Moveable Objects, retrieved on Jul. 7, 2022, https://www.cs.cmu.edu/~maxim/files/cartplanner_icra11.pdf.
Shenawy et al., "Comparing Different Holonomic Mobile Robots," Oct. 2007 IEEE International Conference on Systems, Man and Cybernetics, Montreal, QC, Canada, pp. 1584-1589.
Temizer et al., "Holonomic planar motion from non-holonomic driving mechanisms: The Front-Point Method," Proc. SPIE 4573, Mobile Robots XVI, (Feb. 18, 2002).
Tomo et al., "Design and Characterization of a Three-Axis Hall Effect-Based Soft Skin Sensor," Sensors, Apr. 7, 2016; 16(4):491.
Tomo et al., "Development of a Hall-Effect Based Skin Sensor," IEEE Sensors, Busan, Korea (South), Nov. 1-4, 2015.
Wada et al., "Caster Drive Mechanisms for Holonomic and Omni-directional Mobile Platforms with no Over Constraint," Proceedings of the 2000 IEEE International Conference on Robotics & Automation San Francisco, CA Apr. 2000.
Wang, Ziyu; Autonomous Robotic Cart for Food Delivery on Airplane, [Master's Thesis, NYU Tandon School of Engineering], Fall 2017, retrieved on Jul. 22, 2022 http://engineering.nyu.edu/mechatronics/projects/MSprojects/2017-2018/4/report.pdf.

* cited by examiner

AUTONOMOUS ROBOT DOUBLE DRIVE ASSEMBLY

CROSS-REFERENCE TO RELATED APPLICATIONS

This application claims the benefit under 35 U.S.C. § 119(e) of US Provisional Patent Application 63/561,023 by Davey et al., entitled: "Autonomous Robot Double Drive Assembly", filed on 2024 Mar. 4, which is incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent application relates generally to autonomous robot drive units, and more specifically to a drive assembly with a plurality of independently orientable drive units.

DESCRIPTION OF RELATED ART

Autonomous robots require a propulsion system to provide movement for the robots. Single drive units, with motors powering wheels of an axle and a motor operating a turning bearing to control orientation, have been investigated and found to be unsatisfactory. For such configuration single drive units, due to the possible orientation of the wheels relative to the desired direction of travel being out of sync, the motors of the turning bearing and/or the wheels may need to be driven at high torque values. As the size of the payload of the autonomous robot increases, the required torque significantly increases as well, resulting in the need for large drive motors that creates a large form factor for the drive unit, rendering it impractical for the payload that it can carry.

Overview

Described herein are systems and techniques for a drive assembly for autonomous robots. In a certain embodiment, a robot drive assembly may be disclosed. The robot drive assembly may include a drive assembly enclosure and a plurality of robot drive units. Each of the robot drive units may include a chassis, a plurality of driven wheels, each drive wheel coupled to the chassis and disposed in a fixed orientation relative to the chassis, a plurality of motors, each motor configured to independently drive one of the driven wheels, and a drive unit coupling, configured to interface with a portion of the drive assembly enclosure to allow the respective robot drive unit to rotate relative to the drive assembly enclosure, where the drive unit coupling is configured to allow the chassis to freely rotate relative to the drive assembly enclosure.

In some implementations, the drive unit coupling is unpowered.

In some implementations, the drive assembly enclosure includes a payload coupling configured to couple to a payload.

In some implementations, the robot drive assembly may further include an assembly controller, coupled to the drive assembly enclosure and a plurality of unit controllers, each unit controller disposed within each one of the robot drive units and configured to operate the plurality of motors. Operating the plurality of motors may include obtaining operating instructions for the robot drive unit and determining, based on the operating instructions for the respective robot drive unit, operating instructions for each of the plurality of motors of the respective robot drive unit. The assembly controller may be configured to determine the operating instructions and provide the operating instructions to each of the respective unit controllers. Each of the robot drive units may further include an angular position sensor, configured to determine an orientation of the respective robot drive unit to the drive assembly enclosure.

Obtaining the operating instructions for the robot drive unit may include obtaining a target linear velocity and a target rotational velocity for a first point associated with the robot drive assembly, converting the target linear velocity and the target rotational velocity to a module linear velocity, where the module linear velocity is for a second point associated with the robot drive unit, determining, based on the module linear velocity and the orientation determined by the respective angular position sensor, target motor velocities for driving each of the plurality of motors, and communicating the target motor velocities to each of the respective motors. The second point may be located within the drive unit coupling. In another implementation, obtaining the operating instructions for the robot drive unit may include obtaining a target linear force and a target wrench for a first point associated with the robot drive assembly, converting the target linear force and the target wrench to a module linear force, where the module linear force is for a second point associated with the robot drive unit, determining, based on the module linear force and the orientation determined by the respective angular position sensor, target motor torques for driving each of the plurality of motors, and communicating the target motor torques to each of the respective motors.

In another embodiment, a robot drive unit may be disclosed. The robot drive unit may include a chassis, a plurality of driven wheels, each drive wheel coupled to the chassis and disposed in a fixed orientation relative to the chassis, a plurality of motors, each motor configured to independently drive one of the driven wheels, and a drive unit coupling, configured to interface with a portion of a robot drive assembly to allow the robot drive unit to rotate relative to the portion of the robot drive assembly, where the drive unit coupling is configured to allow the chassis to freely rotate relative to the portion of the robot drive assembly.

In some implementations, the drive unit coupling may be configured to couple to one of a plurality of assembly couplings of the robot drive assembly. The robot drive unit may be configured to operate in conjunction with one or more other robot drive units coupled to the robot drive assembly.

In some implementations, the robot drive unit may further include a unit controller, configured to operate the plurality of motors. Operating the plurality of motors may include obtaining operating instructions for the robot drive unit and determining, based on the operating instructions for the robot drive unit, operating instructions for each of the plurality of motors. The operating instructions for the robot drive unit may be received from an assembly controller of the robot drive assembly. In another implementation, the operating instructions for the robot drive unit may be determined by the unit controller. In a further implementation, obtaining the operating instructions for the robot drive unit may include obtaining a target linear velocity and a target rotational velocity for a first point associated with the robot drive assembly, converting the target linear velocity and the target rotational velocity to a module linear velocity, where the module linear velocity is for a second point associated with the robot drive unit, determining, based on the module linear velocity, target motor velocities for driving each of the plurality of motors, and communicating the target motor velocities to each of the respective motors. The second point may be located within the drive unit coupling. In another implementation, obtaining the operating instructions for the robot drive unit may include obtaining a target linear force and a target wrench for a first point associated with the robot drive assembly, converting the target linear force and the target wrench to a module linear force, where the module linear force is for a second point associated with the robot drive unit, determining, based on the module linear force, target motor torques for driving each of the plurality of motors, and communicating the target motor torques to each of the respective motors.

BRIEF DESCRIPTION OF THE DRAWINGS

The included drawings are for illustrative purposes and serve only to provide examples of possible structures and operations for the disclosed inventive systems, apparatus, methods, and computer program products for an autonomous robot capable of autonomous movement, such as an autonomous robotic cart. These drawings in no way limit any changes in form and detail that may be made by one skilled in the art without departing from the spirit and scope of the disclosed implementations.

DETAILED DESCRIPTION

Introduction

Figure 1:
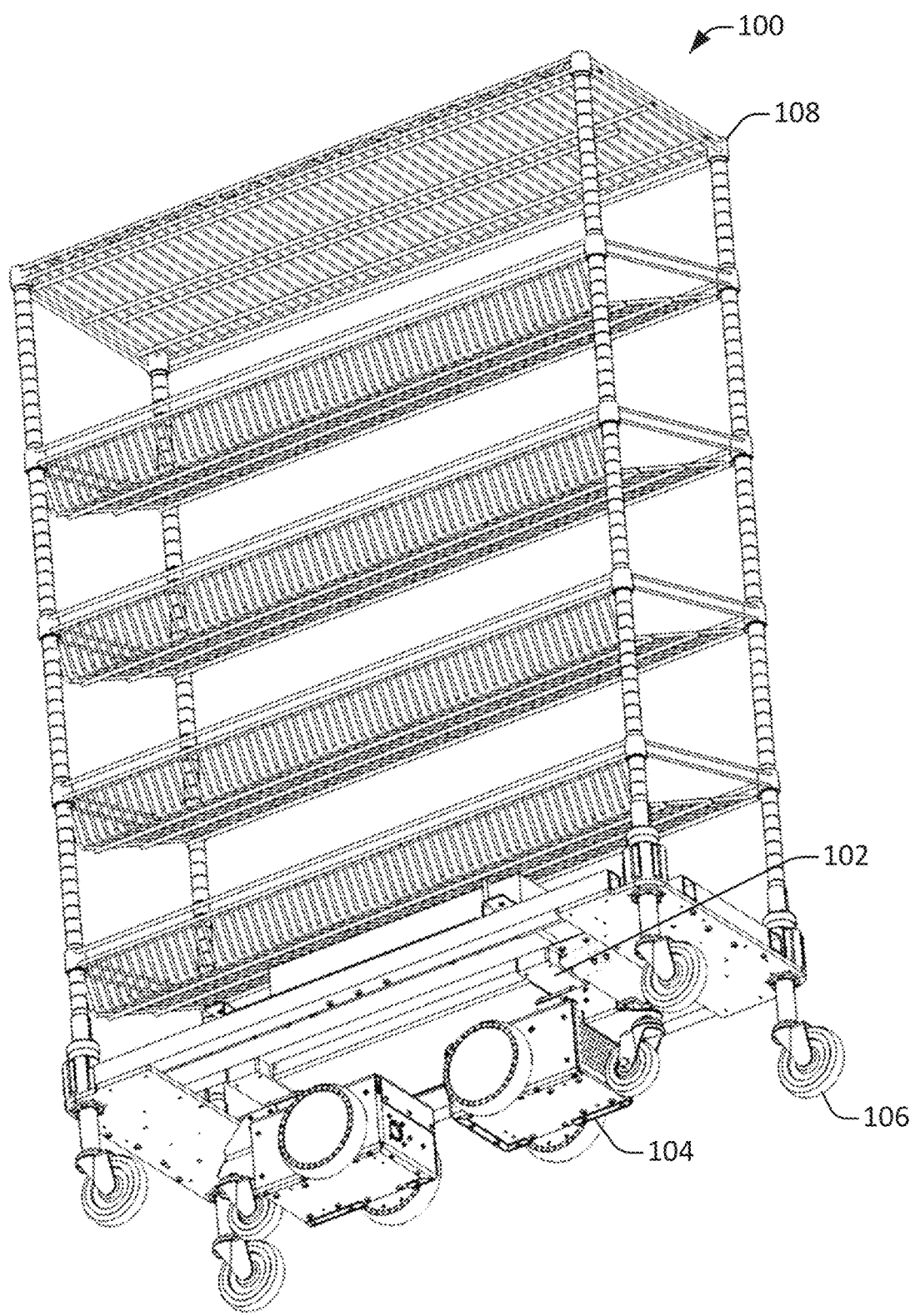
FIG. 1 illustrates a perspective view of an autonomous powered cart, configured in accordance with one or more embodiments.

Techniques and mechanisms described herein provide for a robot configured to operate in cooperation with people. The robot may include a drive assembly to provide motive power. The drive assembly may include a plurality of drive units, each drive unit orientable in an independent manner to that of the other drive units. Each drive unit may include a plurality of driven wheels that may be independently driven. Independent drive of each of the drive wheels of the drive assembly allows for the drive assembly to move the robot in a holonomic (without constraints in their direction of motion) manner.

A robot may be configured as a cart capable of transporting one or more objects. The robot may operate in one of various modes. For example, in an autonomous mode the robot may operate without physical human intervention, for instance autonomously moving from one location to another and/or performing various types of tasks. As another example, in a robot-guided mode, the robot may direct a human to perform a task, such as guiding a human from one location to another. As another example, in a person-guided mode, the robot may operate in a manner responsive to human guidance. The robot may be configured to seamlessly switch between such modes, for instance with the aid of computer vision, user interaction, and/or artificial intelligence.

In some embodiments, a robot may be configured for operation in a warehouse environment. For example, the robot may be equipped and configured to perform and support warehouse operations such as item picking, item transport, and item replenishment workflows. As another example, the robot may be equipped to perform automated item pickup and/or dropoff, for instance via one or more arms or conveyer belts. As still another example, the robot may be equipped to perform automated charging and/or battery swapping. As yet another example, the robot may be equipped to autonomously navigate to a particular location, follow a user, respond to user instructions, amplify a force exerted on the robot by a user, and/or perform other types of operations. The robot may be adapted to site-specific environmental conditions and/or processes.

In some embodiments, an autonomous mobile robot configured in accordance with one or more embodiments may support omnidirectional movement. That is, the autonomous mobile robot may be capable of movement in any direction.

In some embodiments, an autonomous mobile robot configured in accordance with one or more embodiments may support holonomic movement. That is, the autonomous mobile robot may be capable of powered movement in any direction corresponding with a degree of freedom associated with the robot. For instance, a conventional automobile is not holonomic because it has three motion degrees of freedom (i.e., x, y, and orientation) but only two controllable degrees of freedom (i.e., speed and steer angle). In contrast, a conventional train is holonomic because it has one controllable degree of freedom (i.e., speed) and one motion degree of freedom (i.e., position along the track).

In some embodiments, an autonomous mobile robot configured in accordance with one or more embodiments may support omnidirectional and holonomic movement. That is, the autonomous mobile robot may be capable of powered movement and rotation in any direction from any position.

When using conventional techniques and mechanisms, onboarding autonomous mobile robots in an industrial setting takes a significant amount of time. In contrast, various embodiments described herein facilitate rapid onboarding. In some embodiments, a robot can be on-boarded without bringing a robot on-site for an initial survey. Such rapid deployment can significantly increase adoption speed.

When using conventional techniques and mechanisms, even small changes to autonomous mobile robot configuration and workflows cannot be made in real time. In contrast, various embodiments described herein provide for easy adjustments to daily workflows without intervention by a technical support team.

When using conventional techniques and mechanisms, industrial autonomous mobile robots are typically configured with expensive hardware that is customized to particular environments. In contrast, various embodiments described herein provide for autonomous mobile robots may be configured with standardized hardware and software that is easily and cheaply applicable and adaptable to a range of environments.

When using conventional techniques and mechanisms, industrial autonomous mobile robots avoid people and typically treat them like objects. In contrast, various embodiments described herein provide for autonomous mobile robots that employ semantic perception to differentiate people from static objects and move around them intelligently. An autonomous mobile robot may thus perform and/or facilitate human-centric operations such as zone picking, human following, wave picking, a virtual conveyer belt, and user training. Such operations can increase human engagement and reduce the autonomous mobile robot's impact on foot traffic, for instance when its work is unrelated to people nearby.

When using conventional techniques and mechanisms, industrial autonomous mobile robots are difficult to troubleshoot, requiring trained employees or remote support resources to resolve issues. In contrast, various embodiments described herein provide for issue resolution by individuals using the autonomous mobile robots rather than experts with specialized training.

When using conventional techniques and mechanisms, industrial autonomous mobile robots typically provide limited interaction mechanisms. In contrast, various embodiments described herein provide for various types of user interaction mechanisms. For example, a user may interact with the autonomous mobile robot via a touch screen display and force-sensitive handlebars. Using such techniques, individuals may perform tasks such as moving heavy loads, teaching a fleet of autonomous mobile robots about new locations, and resolving issues without interacting with technical support services.

When using conventional techniques and mechanisms, autonomous mobile robots operate using centralized and cloud computing system architectures that increase cost and latency to the robots' ability to respond to rapidly changing warehouse environments. In contrast, various embodiments described herein provide for arms that employ localized processing systems such as neural network architectures. Such approaches provide for lower latency and improved performance, increasing the safety of the autonomous mobile robot and rendering it more responsive to both people and potential hazards in a physical environment.

When using conventional techniques and mechanisms, many industrial autonomous mobile robots rely on expensive LIDAR sensors that observe only a narrow slice of the surrounding environment in limited detail. In contrast, various embodiments described herein provide for autonomous mobile robots with detailed, three-dimensional views of the surrounding environment. Such configurations provide for greater safety, smarter movement and coordination, and deeper data-enabled interactions.

When using conventional techniques and mechanisms, autonomous mobile robots and automated guided vehicles treat people and dynamic objects (e.g., forklifts) as static obstacles to be avoided. In contrast, various embodiments described herein provide for autonomous mobile robots that differentiated between persistent, temporary, and in-motion objects, interacting with them fluidly and efficiently.

When using conventional techniques and mechanisms, an autonomous mobile robot cannot visually distinguish between different individuals. In contrast, various embodiments described herein provide for autonomous mobile robots that can respond to requests from particular individuals and navigate around an environment in more fluid, less disruptive ways. For instance, an autonomous mobile robot may be configured to follow a particular person around a warehouse environment upon request.

In various embodiments, elements with ordinal indicators that end with similar numbers (e.g., X06 and Y06) may be different embodiments of similar components (e.g., different embodiments of payload support features). As such, for example, the description provided for X06 may apply for Y06, and vice versa, throughout this disclosure.

Overall Architecture

FIG. 1 illustrates a perspective view of an autonomous powered cart, configured in accordance with one or more embodiments. FIG. 1 illustrates autonomous robot 100, which includes drive assembly 102 and payload 108.

Drive assembly 102 includes a plurality of drive unit 104 and one or more payload support element 106. Drive unit 104 may be a drive unit that includes a plurality of powered wheels. In the embodiments described herein, the plurality of drive unit 104 may be configured to be operated, jointly or independently, to power autonomous robot 100 and provide movement to autonomous robot 100 in a backdriveable and holonomic manner.

Payload support element 106 may be one or more support features (e.g., castor wheels, sliding pads, and/or other structures that may provide stability while accommodating movement). Payload support element 106 may be disposed within portions of drive assembly 102 and/or coupled to portions of payload 108 to provide stability for autonomous robot 100. In various embodiments, payload support element 106 may be disposed or coupled to any portion of drive assembly 102 and/or payload 108 to provide stability. In certain embodiments, payload support element 106 may provide sufficient support for payload 108 to allow for that various drive units 104 to be positioned in an optimal manner to provide for predictable backdriveable and holonomic movement. Thus, payload support element 106 may provide for stability while payload 108 (which may be, for example, a shelf) is loaded or unloaded while the various drive units 104 are positioned to allow for good handling of autonomous robot 100.

Drive assembly 102 may be a drive assembly configured to couple to payload 108 to move payload 108. In various embodiments, drive assembly 102 may couple to payload 108 via any technique, such as via openings on a body (e.g., one or more portions of payload 108 may be inserted into one or more openings disposed within the body of drive assembly 102), mechanical fasteners (e.g., bolts, screws, and/or other techniques), permanent or semi-permanent techniques such as welding, adhesives, and/or other such techniques. As such, drive assembly 102 may be a module that may, in certain embodiments, be coupled to any number of different versions of payload 108. Payload 108 may be a commercially available (e.g., off-the-shelf) utility body, such as a shelf, or may be an item customized for use with drive assembly 102.

Payload 108 may be any commercially available or custom item. In various embodiments, payload 108 may be any tool that may assist in operations. For example, payload 108 may be a cart (which may include a mounted shelf), a mounted robot, a container box, and/or other such item. While description may be provided in the manner of autonomous carts and shelves, it is appreciated that other embodiments of payload 108 are within the scope of the disclosure, such as assembly robots.

Drive Assembly Examples

Figure 2:
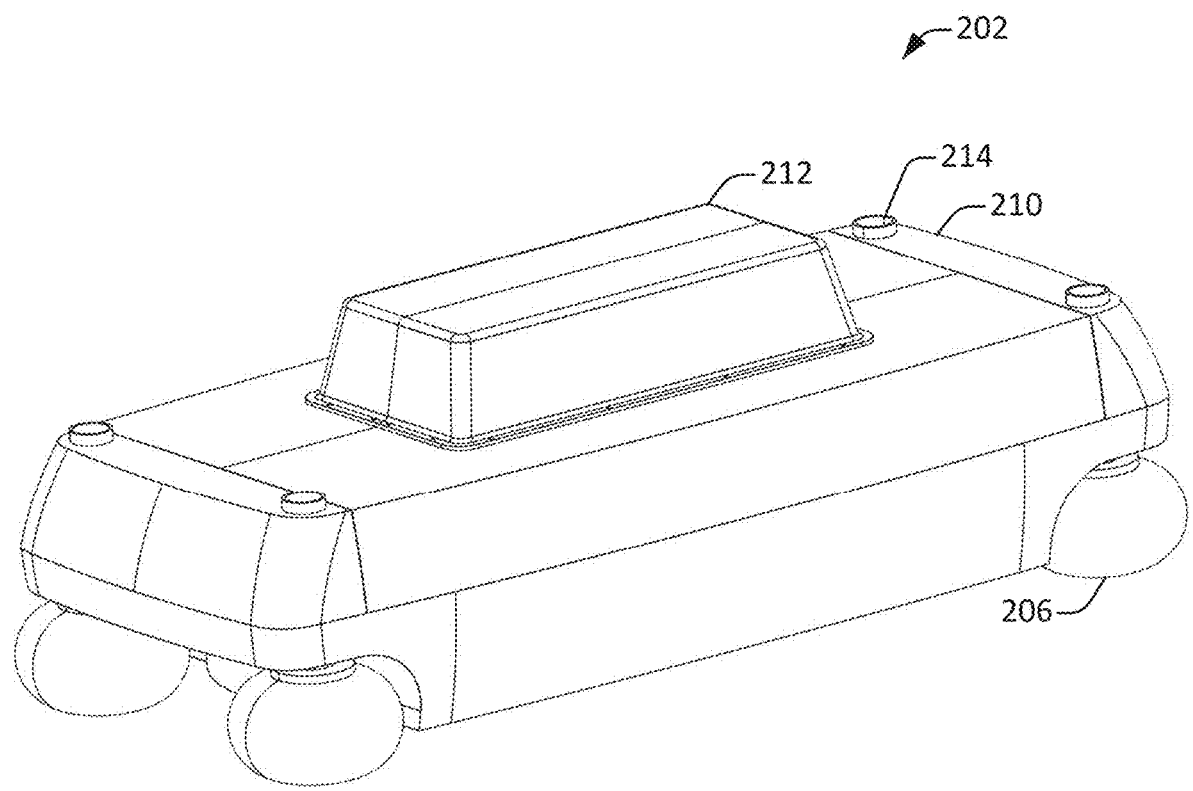
FIG. 2 illustrates a perspective view of a unitized double drive assembly for a autonomous powered cart, configured in accordance with one or more embodiments.

FIG. 2 illustrates a perspective view of a unitized double drive assembly for an autonomous powered cart, configured in accordance with one or more embodiments. FIG. 2 illustrates drive assembly 202 that includes payload support element 206, drive assembly enclosure 210, drive unit enclosure 212, and payload coupling 214. Payload support element 206 may be one or more support features similar to payload support element 106.

Drive assembly enclosure 210 may be an outer case/body for drive assembly 202 and may include features for containing various components of drive assembly 202 (such as the drive units described herein, within drive unit enclosure 212) as well as features, such as payload coupling 214 for coupling to payload 108. Payload coupling 214 may, for example, be an opening, a rod, a mechanical fastener, and/or another such feature configured to allow for drive assembly 202 to couple to payload 108. Drive unit enclosure 212 may be configured to contain the drive units, batteries, control systems, and/or other items that allow for the operation of the drive units to provide movement for autonomous robot 100.

Figure 3:
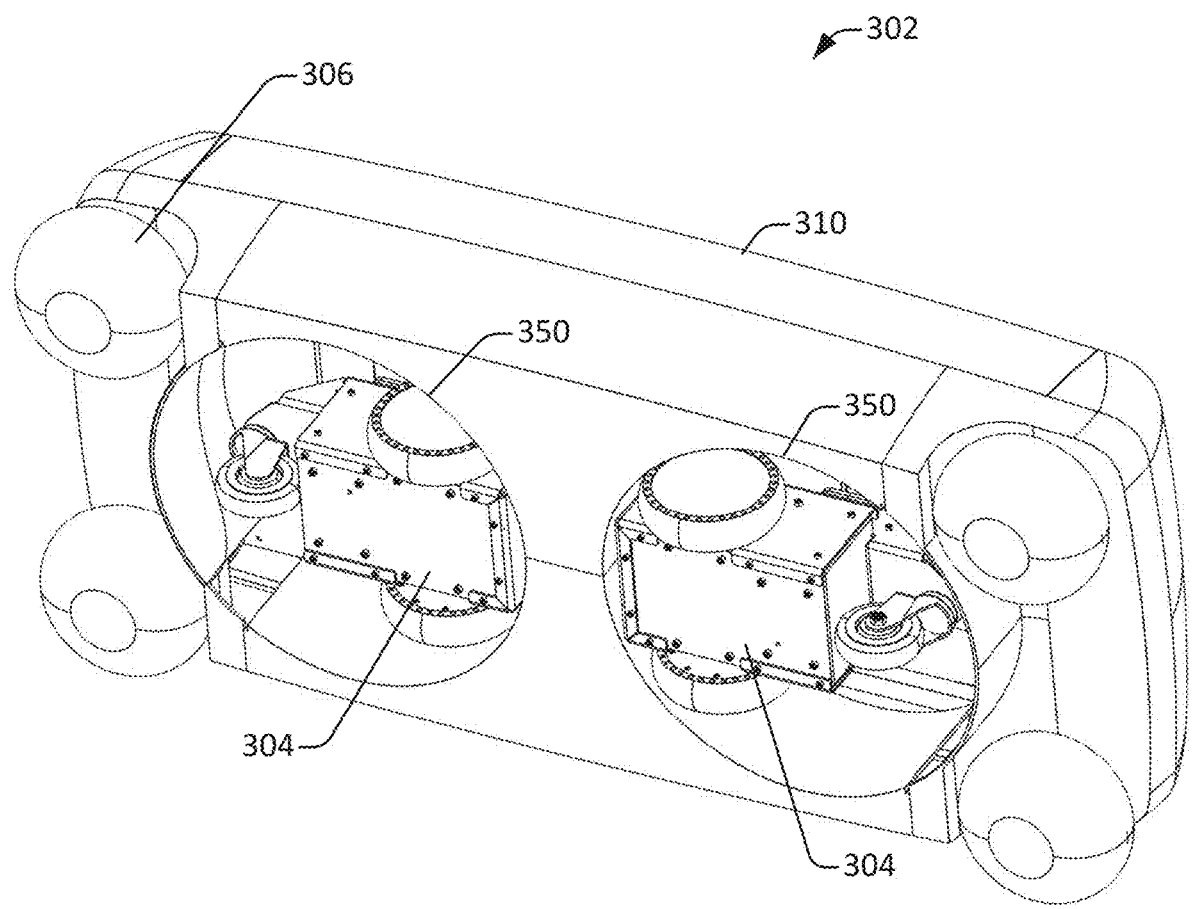
FIG. 3 illustrates a bottom view of a unitized double drive assembly for a autonomous powered cart, configured in accordance with one or more embodiments.

FIG. 3 illustrates a bottom view of a unitized double drive assembly for an autonomous powered cart, configured in accordance with one or more embodiments. FIG. 3 illustrates drive assembly 302, which may be similar to drive assembly 202. As illustrated in FIG. 3, drive assembly 302 includes drive assembly enclosure 310, a plurality of drive unit 304, with the drive wheels of each drive unit 304 disposed within an opening 350, and one or more payload support element 306.

As described herein, drive assembly 302 includes a plurality (e.g., two or more) of drive units 304. Operation of the plurality of drive units 304 may be coordinated by one or more elements of drive assembly 302, such as one or more controllers described herein.

A plurality of drive units 304 is superior to utilization of a single drive unit for providing movement to autonomous robot 100. Single drive units, to provide directional control, utilize motors to drive each wheels and on a central turning axis that allows for changing of the orientation of the single drive unit relative to the payload. Due to the possible orientation of the wheels relative to the desired direction of travel being out of sync, the central turning axis motor and/or the wheel motors may need to be driven at high torque values to provide the desired movement to an autonomous robot. As the size of the payload increases, the required torque may significantly increase as well. The high torque requirements result in the need for large drive motors, resulting in a large form factor for single drive units that may be impractical in comparison to the payload.

By contrast, the currently disclosed techniques that utilize a plurality of drive units (e.g., double drive units) allow for the elimination of the central turning axis motor. The turning bearing (which may be, for example, a component of drive unit coupling 420 shown in FIG. 4), allows for rotation of each drive unit 404 relative to drive assembly enclosure 310 and/or payload 108. Thus, drive assembly 302 may include corresponding features configured to receive and/or couple to drive unit coupling 420, such as a plurality of assembly coupling. The assembly couplings may include features that also allow for rotation of drive unit coupling 420 (e.g., bearings) and/or may be a fixed coupling and rotational elements allowing for drive unit 404 to rotate relative to drive assembly enclosure 310 and/or payload 108 may be disposed within drive unit coupling 420 (e.g., drive unit coupling 420 may include one or more bearings, slip features, and/or other such features that allow for rotation).

As the double drive unit provides for four independently operated drive wheels (e.g., drive wheel 416 shown in FIG. 4), the turning bearing does not need to be actively controlled and, thus, no motor is needed to drive the turning bearing to control the orientation of each drive unit 304 relative to payload 108. The turning bearing may be passively oriented. Instead, independent operation of the individual drive wheels is sufficient to provide orientation control. Furthermore, the torque requirements for each individually driven wheel, when utilizing a plurality of drive unit 304, decreases the torque requirements for each individually driven wheel.

The elimination of the central turning axis motor for the turning bearing and lower torque requirements for each individually driven wheel allows for a much smaller form factor for drive assembly 302. Thus, drive assemblies as described herein that utilize a plurality of drive unit 304 instead of a single drive result in smaller form factors that are more compatible with the form factors of payload 108 and include smaller and cheaper drive motors.

Furthermore, drive assemblies as described herein, that utilize a plurality of drive unit 304, are much more backdriveable than single drive techniques. In certain applications, such as robotic applications where a user may interact with autonomous robot 100 to manipulate movement and/or position of autonomous robot 100, backdriveability may be desirable to allow a user to easily provide inputs to autonomous robot 100 and manipulate the position of autonomous robot 100. The lack of a central turning axis motor, which decreases the resistance of drive unit 304, may allow for lower effort backdrive compared to single drives. Backdriveability may be further aided through configuration of the drive motors to accommodate backdriving.

Additionally, the configuration of drive assemblies that utilize a plurality of drive unit 304 allow for rotational movement of drive assembly 302 around virtual points. For example, drive assembly 302 may include two drive unit 304, which may each include two independently driven drive wheels. Accordingly, such an embodiment of drive assembly 302 may include four independently driven drive wheels and allow for three degrees of freedom of movement (x, y, and theta) and, thus, movement of drive assembly 302 around virtual pivot points.

In certain embodiments, drive unit enclosure 212 may fully contain each drive unit 304. As such, each drive unit 304 may couple to and rotate relative to drive unit enclosure 212. In other embodiments, drive unit 304 may be coupled to payload 108 or another portion of autonomous robot 100.

Drive Unit Examples

Figure 4:
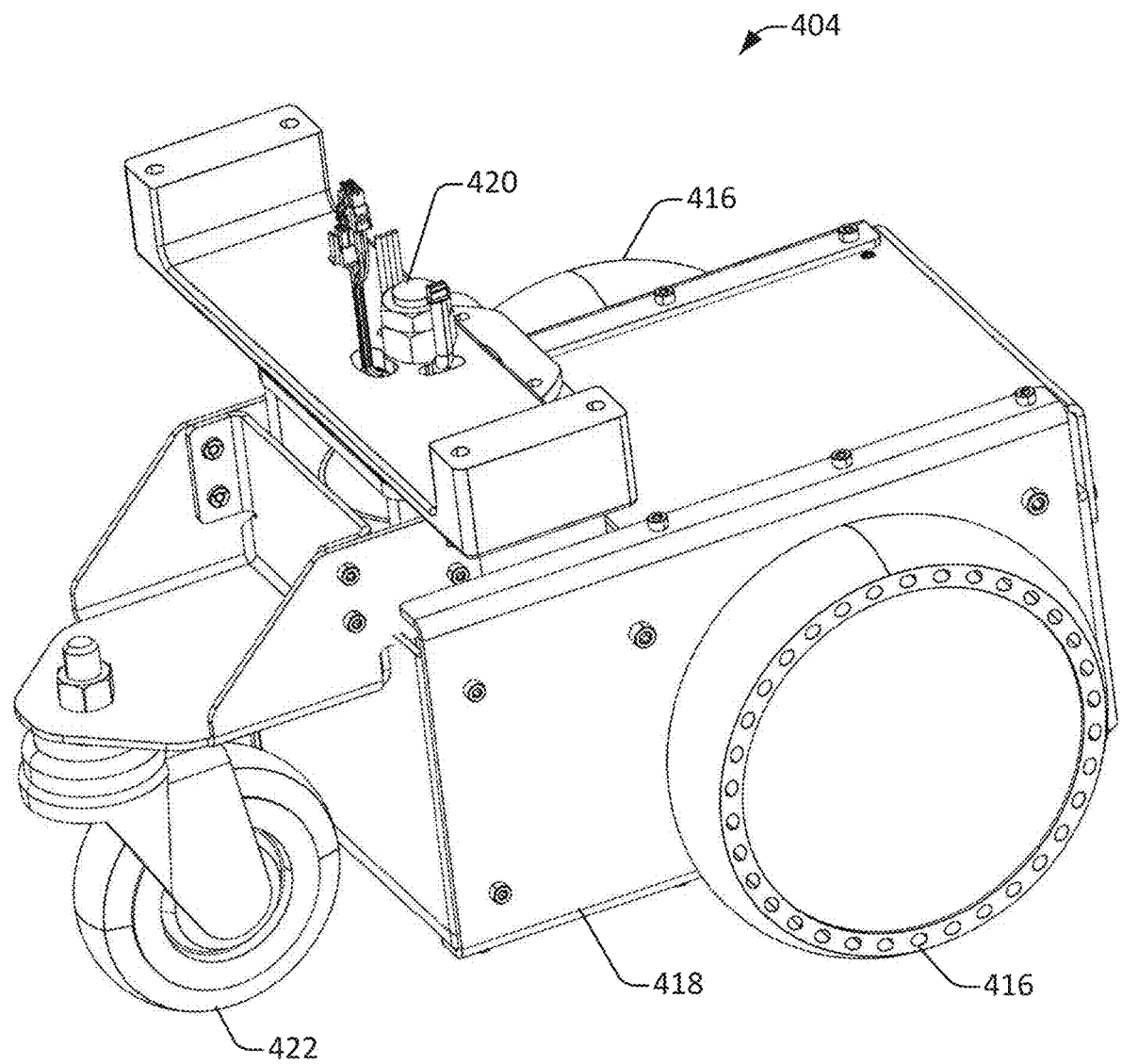
FIG. 4 illustrates a perspective view of a drive unit for an autonomous powered cart, configured in accordance with one or more embodiments.

FIG. 4 illustrates a perspective view of a drive unit for an autonomous powered cart, configured in accordance with one or more embodiments. FIG. 4 illustrates drive unit 404. A plurality of drive unit 404 may be utilized in each drive assembly 302.

Drive unit 404 may include a plurality of drive wheel 416, housing 418, drive unit coupling 420, and drive unit support 422. Drive wheel 416 may be a plurality of driven wheels, each wheel driven independently (e.g., by an associated electric motor). Thus, each drive wheel 416 may be driven independently of the other driven wheels, according to the techniques described herein.

Housing 418 may be a housing configured to contain one or more of motors, controllers (e.g., ECUs or circuit boards), connectors, wires, and/or other such elements for operation of drive unit 404. Housing 418 may be any type of container, such as sheet metal, plastic, composite, and/or other such containers.

Drive unit coupling 420 may allow for portions of drive unit 404, such as drive wheel 416, to move (e.g., rotate) relative to other portions of drive assembly 302. Thus, drive unit coupling 420 may include one or more rotational couplings, such as turning bearings, as well as electrical and mechanical couplings (e.g., data couplings configured to communicate data between sensors or controllers disposed on drive unit 404 to/from sensors or controllers disposed elsewhere on autonomous robot 100). In certain embodiments, drive unit coupling 420 may be configured to allow housing 418, drive wheel 416, and/or drive unit support 422 to freely rotate relative to drive assembly 302 and/or payload 108 (e.g., due to the turning bearings). Thus, there is no active orientation control of drive unit coupling 420 and, thus, housing 418. Rather, orientation of housing 418 may be controlled by operation of drive wheel 416. Torque from housing 418 provides for directional control of drive unit 404.

With dual driven wheels, continuous contact between the ground and each of drive wheel 416 is desirable in order to avoid introducing any unintended yaw to drive unit 404 from wheel lift. In certain embodiments, drive unit 404 as a module and/or each drive wheel 416 may include suspension. Such suspension may include any type of spring (e.g., coil spring, elastomer, torsion bar, and/or other such springs), damper, and/or compliance material (e.g., compliance tires) for controlling the suspended elements. Such suspension may allow for drive wheel 416 to maintain contact with the ground.

Optional drive unit support 422 may be one or more support structures, such as castor wheels, sliding surface, and/or other such supports. Drive unit support 422 may provide support for drive unit 404 for additional stability and may not be driven (e.g., powered by any motors). Certain embodiments of drive unit 404 may not include drive unit support 422.

Figure 5A:
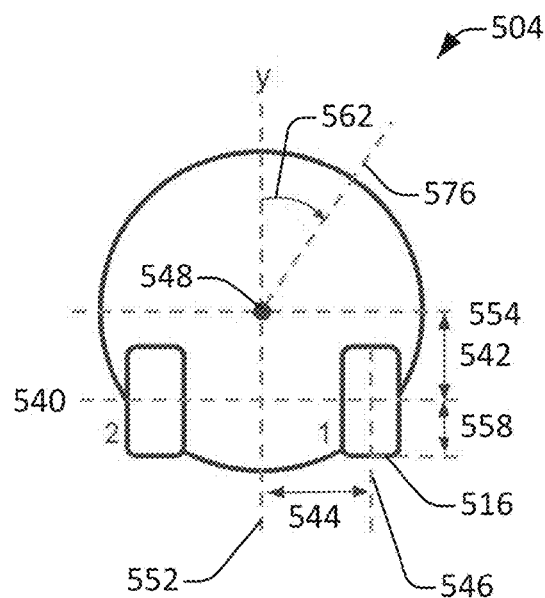
FIGS. 5A and 5B illustrate top views of representations of a drive unit and a drive assembly, respectively, for an autonomous powered cart drive, configured in accordance with one or more embodiments.
Figure 5B:
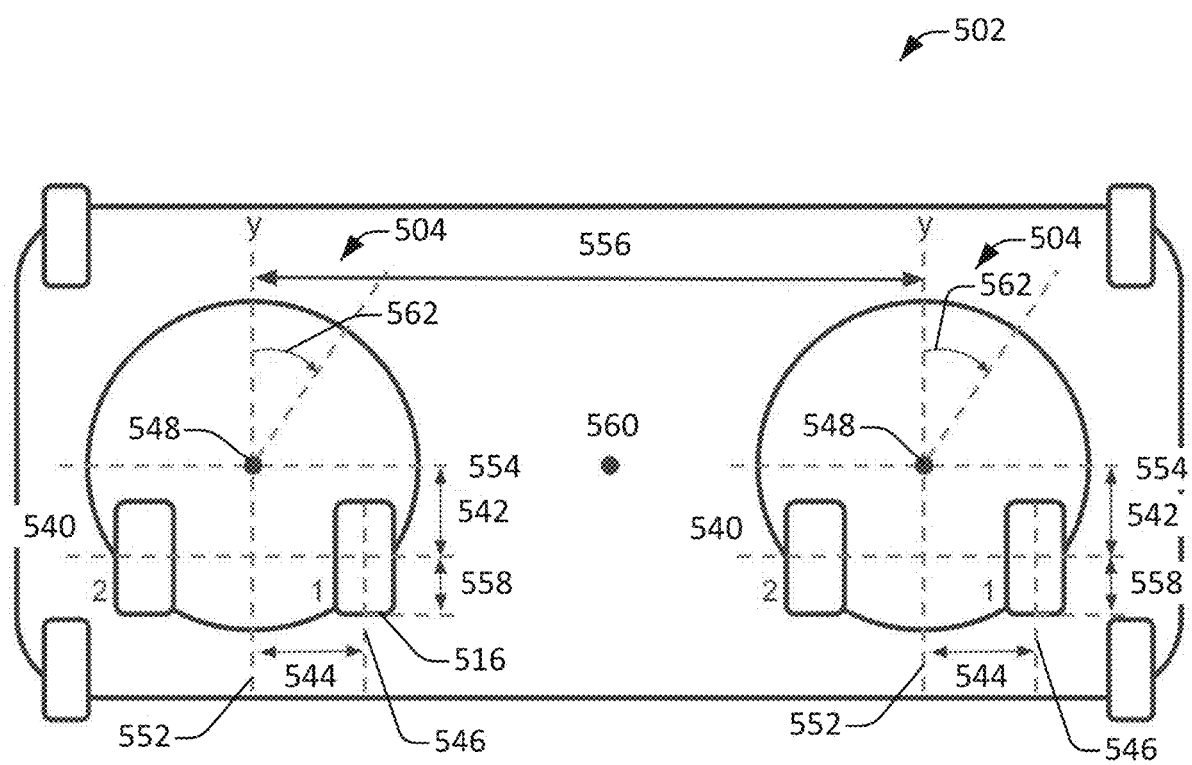

FIGS. 5A and 5B illustrate top views of representations of a drive unit and a drive assembly, respectively, for an autonomous powered cart drive, configured in accordance with one or more embodiments. FIG. 5A illustrate drive unit 504 and FIG. 5B illustrates drive assembly 502 that includes a plurality of drive units 504. For drive assembly 502 of FIG. 5B, the two drive units 504 are separated by center-to-center distance 556, which may be the distance between axis of rotation 548 between the pivot bearings of each drive unit 504.

Each drive unit 504 may include its own heading, which is signified by the x-y axes shown in the figures provided herein. Thus, drive unit 504 may include its own associated y-axis, which corresponds to axis 552, the nominal direction of travel of wheel 516 and may include its own associated x-axis, which is normal to the y-axis (e.g., width-wise along drive unit 504) and corresponds to axis 554.

In certain situations, the direction of travel of drive assembly 502 and, thus, the direction of travel of drive units 504 coupled to the drive assembly 502, may be a different heading than that of the direction that wheels 516 of drive units 504 are pointed towards. That is, while wheels 516 may be pointed in the direction of y-axis 552, drive units 504 and drive assembly 502 may be traveling in travel direction 576. Theta 562 may be the angle difference between y-axis 552 and travel direction 576. Accordingly, which drive unit 504 may have its own theta angle.

As shown, each drive wheel 516 of a drive unit 504 includes wheel/tire centerline 546, corresponding to the centerline of the wheel/tire, and axle centerline 540, the axis of rotation of drive wheel 516. In the embodiments shown in FIGS. 5A and 5B, both drive wheel 516 may share a single axle centerline 540, but other embodiments may include different axes of rotation for each drive wheel 516. Each drive wheel 516 may be a wheel radius 558, which is the radius for the rolling size of wheel 516.

Furthermore, drive unit coupling 420 (not shown in FIGS. 5A and 5B, but shown in FIG. 4) includes axis of rotation 548 for the pivot bearing of drive unit coupling 420, as well as y-axis 552 and x-axis 554, which are normal axes for determining the distance between various elements of drive unit 504 to axis of rotation 548.

The embodiment shown in FIGS. 5A and 5B is configured such that both drive wheels 516 rotate around axle centerline 540, which may be a fixed axis of rotation. That is, neither drive wheel 516 may swivel or steer. Instead, steering control of drive unit 504 (around axis of rotation 548) and/or drive assembly 202 is accomplished through torque vectoring of the drive wheels creating yaw.

Variously, x-axis of 554 of axis of rotation 548 may be located a first distance 542 apart from axle centerline 540 and second distance 544 may be the distance between wheel/tire centerline 546 and y-axis 554. In certain embodiments, the ratio of 544 to 542 may be between 1 to 3 and 3 to 1. The ratio of 542 to 556 may be between 1 to 3 and 1 to 10. First distance 542 and second distance 544 may impact the handling and/or torque requirements of drive unit 504 and may, thus, be distances that are adjusted to tune the handling of the drive units of autonomous robot 100. Center to center distance 556 may also impact the handling and/or torque requirements of drive assembly 502. As center-to-center distance 556 increases, the motor torque requirements may decrease due to a larger moment arm to rotate the payload from each drive unit.

In the double drive configuration of drive assembly 502, each drive unit coupling 420 does not include a steering motor. The individual drive motor torque requirement for each drive wheel 516 to rotate about center 560 is lower than in the single drive configuration since the interaction of the two drive units 504 located at half of center-to-center distance 556 from center 560 can each contribute half the necessary torque to rotate the payload about center 560. The torque generated by each drive unit 504 about center 560 is:

Torque=2*(force generated by individual drive unit 504)*[(distance of 556)/2]=(force generated by individual drive unit 504)*(distance of 556)

Accordingly, the changing of the distance of 556 and, thus, the changing of the lever arm, would impact the torque imparted by drive unit 502 to autonomous robot 100. Increasing center to center distance 556 may lower the motor torque requirement to turn payload 108 and autonomous robot 100 since moment arm about center 560 is larger.

Furthermore, changes to various distances shown in FIGS. 5A and/or FIG. 5B may affect holonomicity. For example, increasing first distance 542 relative to second distance 544 may increase lateral mobility, resulting in a greater ratio of lateral to rotational velocity. Decreasing wheel radius 558 relative to first distance 542 and second distance 544 may increase holonomicity, but may lower the maximum speed of differential drive and reduce terrain handling.

In a single drive configuration, there is a large torque requirement on the turret motor at center 560 to provide the required rotation to autonomous robot 100 due to the rotational inertia of the mass. Thus, the equivalent single drive unit would require a significantly larger turret motor to achieve the same torque capabilities of 2 spaced out drive units.

Figure 6:
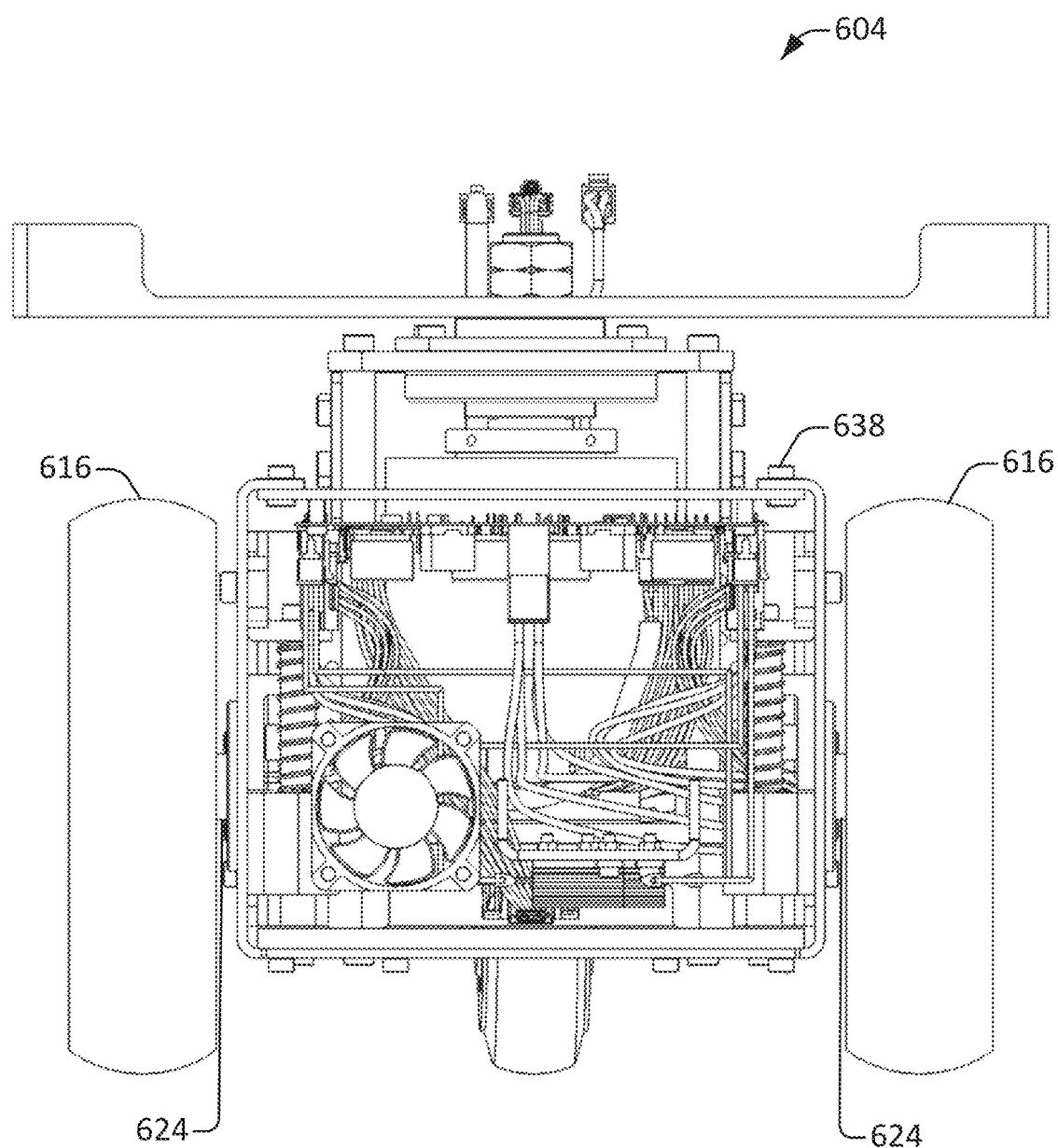
FIG. 6 illustrates a rear view of features of a drive unit for an autonomous powered cart, configured in accordance with one or more embodiments.

FIG. 6 illustrates a rear view of features of a drive unit for an autonomous powered cart, configured in accordance with one or more embodiments. FIG. 6 illustrates drive unit 604. Drive unit 604 may be similar to drive unit 404 without housing 418. FIG. 6 illustrates that drive unit 604 includes a plurality of drive wheel 616, each powered by a drive motor 624. In various embodiments, drive motor 624 may be any type of motor, including any type of electric motors configured to provide rotational power to a wheel. Drive motor 624 may include an energy source, such as a fuel or electricity source, that may be disposed on drive until 604 and/or within the drive assembly. Drive motor 624 may, variously, include electric motors that are disposed on the chassis and/or disposed on wheel 616 (e.g., hub motors).

As each drive wheel 616 is powered by an individual drive motor 624, each drive wheel 616 may be individually powered and operated, allowing movement of autonomous robot 100 along a plurality of degrees of freedom in a holonomic manner. As shown in the embodiment of FIG. 6, though each drive motor 624 powers a drive wheel 616, there is no steering servo for each individual drive wheel 616. That is, the orientation of each individual drive wheel 616 is fixed relative to chassis 638 of drive unit 604 and, thus, does not rotate relative to chassis 638.

Figure 7:
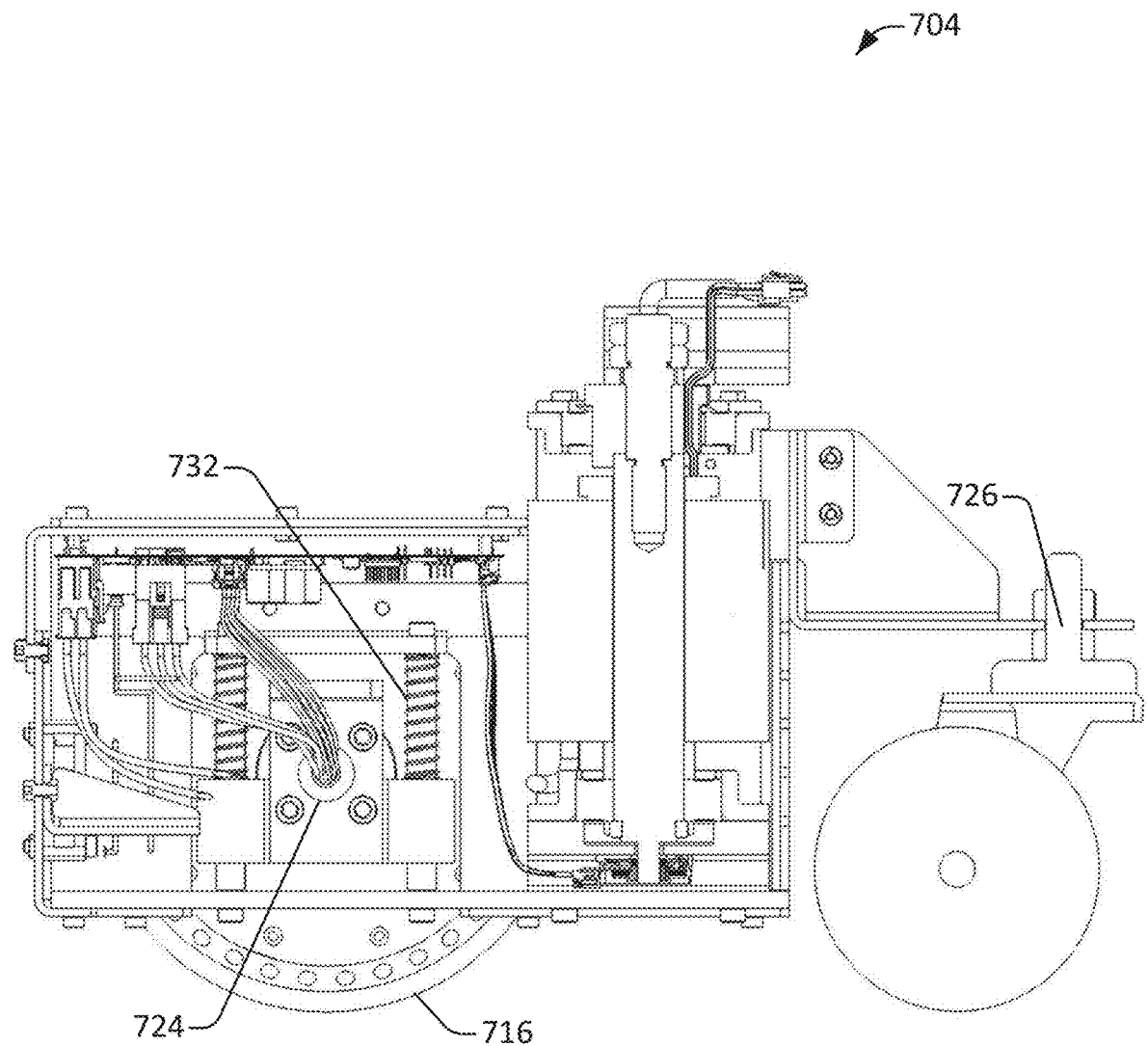
FIG. 7 illustrates a cutaway side view of features of a drive unit for an autonomous powered cart, configured in accordance with one or more embodiments.

FIG. 7 illustrates a side cutaway view of features of a drive unit for an autonomous powered cart, configured in accordance with one or more embodiments. FIG. 7 illustrates drive unit 704, which includes a plurality of drive wheel 716, each powered by a drive motor 724, as well as support coupling 726. Support coupling 726 may be configured to receive drive unit support 422 and allow for drive unit support 422 to freely rotate relative to chassis 638.

In certain embodiments, drive unit 704 may include suspension 732. Suspension 732 may be any type of suspension and may include any one of one or more springs (e.g., coil spring, elastomer, torsion bar, and/or other such springs), dampers, and/or compliance materials (e.g., compliance tires) for controlling the suspended elements (e.g., drive wheel 716) to allow drive wheel 716 to maintain contact with the ground.

Figure 8:
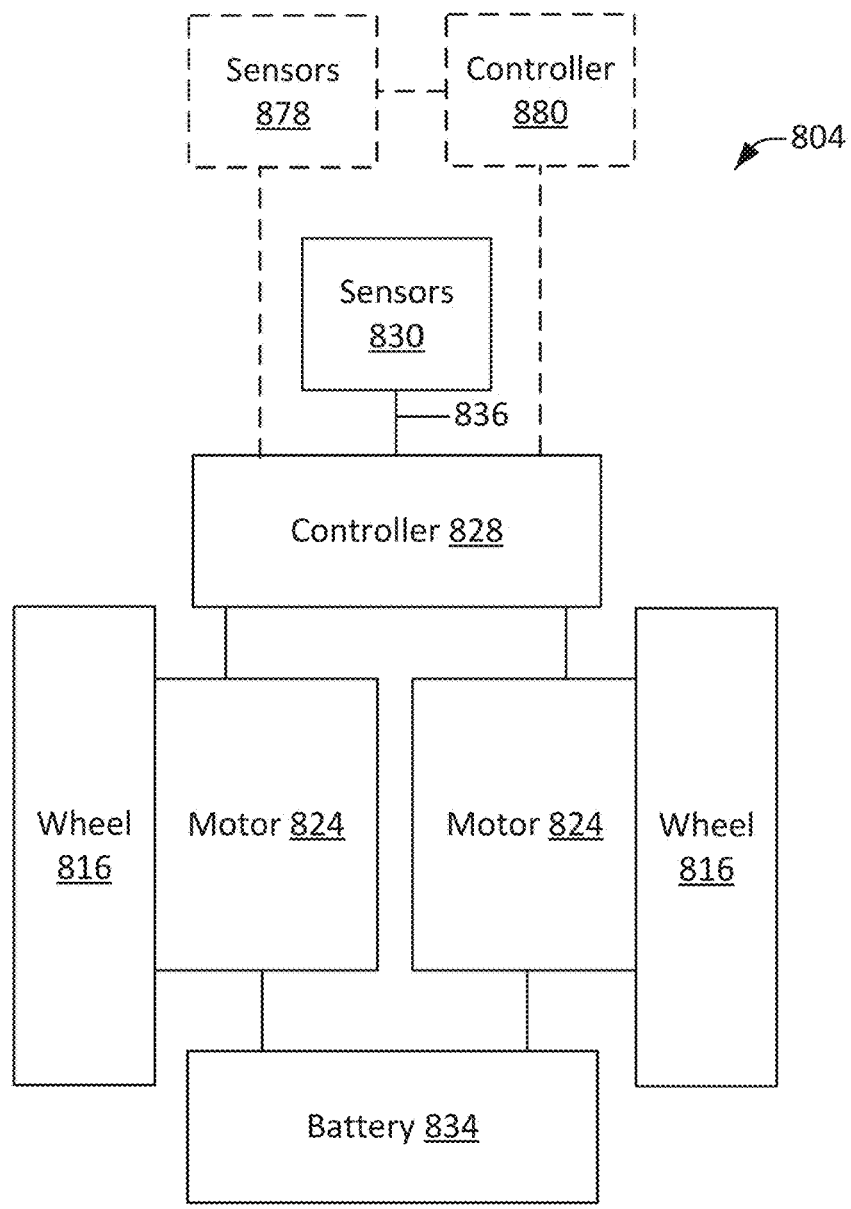
FIG. 8 is a block diagram of a drive unit for an autonomous powered cart, configured in accordance with one or more embodiments.

FIG. 8 is a block diagram of a drive unit for an autonomous powered cart, configured in accordance with one or more embodiments. FIG. 8 illustrates drive unit 804, which includes a plurality of drive wheel 816 powered by drive motor 824, controller 828, sensors 830, battery 834, and circuitry 836.

Controller 828 may be one or more control units that includes one or more processors, memories, and/or other circuitry configured to receive, process, and provide signals/data. Various elements of controller 828 may be further described in FIG. 11. Controller 828 may receive data from, for example, sensors 830 (e.g., sensor data indicating the environmental conditions around drive unit 804) and/or drive motor 824 (e.g., data indicating the operation aspects of drive motor 824, such as resistance experienced by drive motor 824) and may be configured to provide operating instructions to the various drive motor 824 (e.g., to operate at a determined power or rpm level).

Sensors 830 may be any sensor configured to aid in the operation of autonomous robot 100, such as aid in determining operating routes and/or parameters for drive unit 804. Thus, sensors 830 may be one or more of a radar, lidar, visual camera, thermal camera, and/or other such sensor. Sensors 830 may provide input to controller 828 to determine operating instructions for autonomous robot 100, including for operation of the drive units or the drive assembly.

Additionally or alternatively, the drive assembly may include sensors 878, which may be sensors as described for sensors 830 that are coupled to portions of the assembly not on drive unit 804. Sensors 830 may provide data to controller 828 of drive unit 804 and/or to one or more controllers 880 of the drive assembly. Sensors 830 and/or controller 828 may communicate data to the controllers 880 of the drive assembly as well.

In certain embodiments, sensors 830 may include an absolute encoder measuring the pivot turning axis of drive unit 804 (e.g., relative to another drive unit, to drive assembly enclosure 210, to payload 108, and/or to another portion of autonomous robot 100) to determine the pivot position of each drive unit 804. Furthermore, sensors 830 may include encoders and hall effect sensors to measure position of the motors 824.

Electrical signals and/or data may be communicated between the various elements of drive unit 804 via circuitry 836. Circuitry 836 may be any type of wired and/or wireless circuitry for communicating data and/or electrical signals (e.g., electrical power). Electrical power may be stored within battery 834 and provided to each drive motor 824 according to instructions provided by controller 828.

The configuration of drive unit 804 allows for the operation of a drive unit. In certain embodiments, circuitry 836 may be further communicatively coupled to other portions of autonomous robot 100, such as another drive unit and/or a controller on another portion of autonomous robot 100 (e.g., a controller that coordinates operation of the plurality of drive units). Additionally or alternatively, controller 828 may coordinate operation of a plurality of different drive units.

Operation Examples

Figure 9:
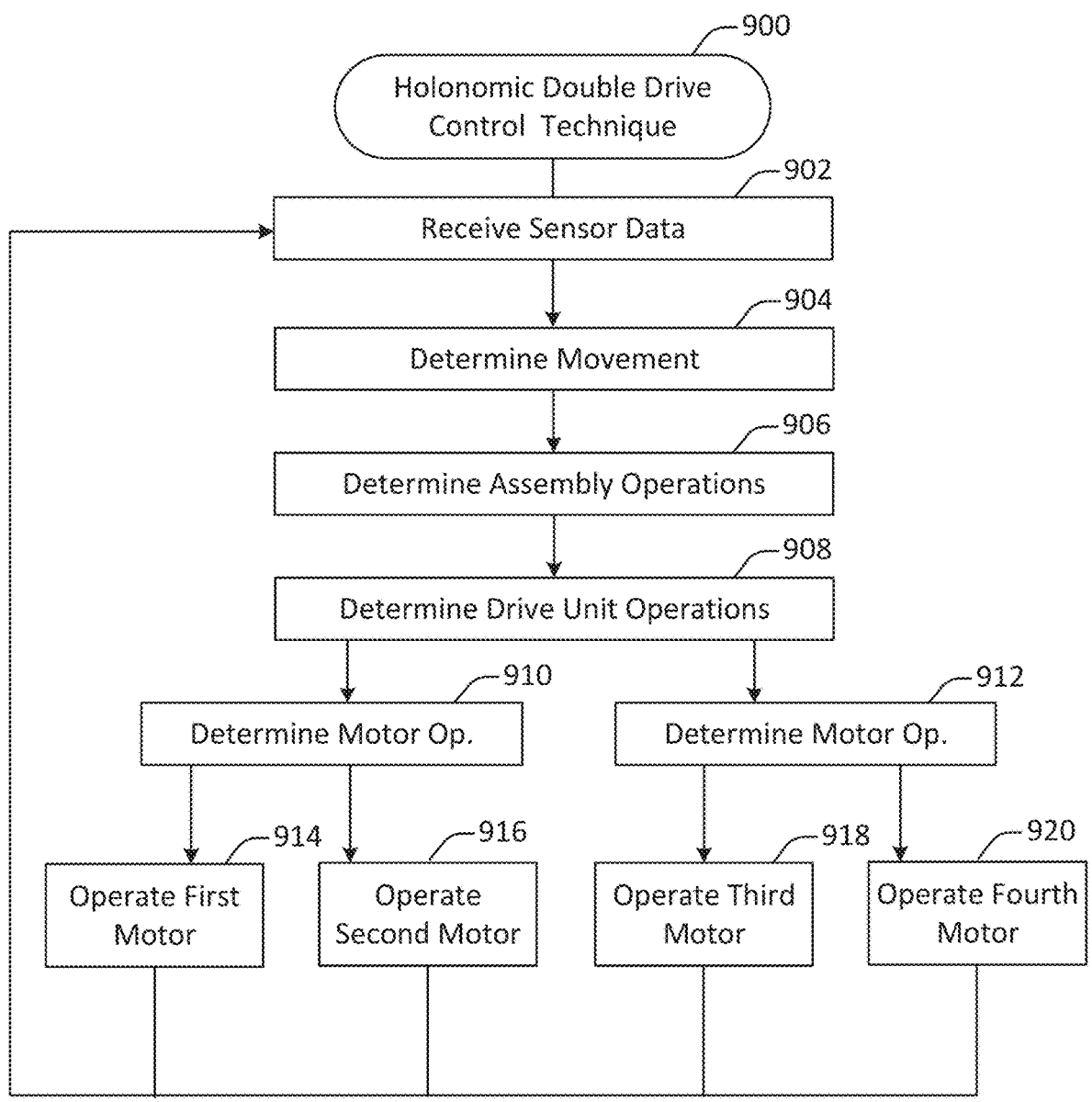
FIG. 9 is a flowchart detailing techniques for operating a double drive powered car, configured in accordance with one or more embodiments.

FIG. 9 is a flowchart detailing techniques for operating a double drive powered cart, configured in accordance with one or more embodiments. FIG. 9 is a flowchart detailing technique 900, allowing for control of a double drive assembly as described herein in a holonomic manner.

In 902, a drive assembly may receive sensor data. The sensor data may be generated by one or more sensors 830 and may provide data related to the environment and/or operation of a drive unit, the drive assembly, or the cart. The sensor data may aid in the determination of operating instructions for the drive assembly.

In 904, movement for the autonomous cart may be determined. Such movement may be based on the sensor data received in 902. In certain embodiments, the movement may be a path, such as a pre-determined path. In other embodiments, the movement may be determined in real time by the controller, such as a trajectory determined by the controller for an upcoming portion of time. That is, the controller may determine the desired movement for the autonomous cart for an upcoming amount of time, distance, commands (e.g., movement commands), and/or other such units. For example, the controller may determine desired movement for the upcoming 30 seconds or less, for the upcoming 50 meters or less, for the next five commands, and/or other such example considerations.

The time, distance, and/or magnitude may vary depending on requirements. In certain embodiments, the controller may adjust the time, distance, and/or magnitude of the upcoming movement depending on sensor data received. Thus, for example, if the controller determines that the autonomous cart is in a crowded environment and/or otherwise in an environment where instructions are required to be shorter, such as a crowded warehouse, the time, distance, and/or magnitude may be adjusted lower (e.g., adjusted from the upcoming 5 seconds to the upcoming 1 second). Conversely, if the controller determines that the autonomous cart is in an environment that justifies longer duration instructions, such instructions may be adjusted higher. Furthermore, sensor data may be continuously received so that, even if instructions for, for example, the upcoming 5 seconds is generated, if changing conditions are indicated by the sensor data, such instructions may be overridden with updated instructions.

The determined movement may include translation and rotational movement. Translational movement includes linear movement as well as crab walking and other such movement. Rotational movement includes rotation of the autonomous robot around certain pivot points, including virtual pivot points. Geological features of the desired path, such as obstacles and surfaces, of the path may be determined based on pre-existing data and/or data from the sensors.

Based on the sensor data and the determined movement, operating instructions for the assembly may be determined in 906. The assembly instructions include determinations of the movement parameter for the entire assembly (e.g., the entire autonomous cart or drive assembly). Such instructions may include, for example, translational and/or rotational velocity, heading, and/or translational and/or rotational acceleration. In various embodiments, such instructions may be from the frame of reference of a reference point associated with the autonomous cart or drive assembly. Such a reference point may be located on the autonomous cart (e.g., in the center of the autonomous cart) and/or may be a point that is located away from the autonomous cart. The sensors of the autonomous cart may include accelerometers, velocity sensors, location sensors, and/or other such sensors (e.g., visual cameras) to allow for accurate determination of the movement of the autonomous cart relative to the reference point.

Based on the operating instructions for the assembly, operating instructions for each individual drive unit may be determined in 908. Thus, based on the movement parameter for the entire assembly, movement parameters for each individual drive unit of the drive assembly may be determined and such instructions may include, for example, translational and/or rotational velocity, heading, and/or transitional and/or rotational acceleration. In various embodiments, such instructions may be from any frame of reference, such as from axis of rotation 548 of drive unit 504. In certain embodiments, each drive unit may determine the orientation of the drive unit relative to the rest of the drive assembly (e.g., from an angular position sensor such as a steering angle sensor) and determine how to achieve a required centerpoint velocity (e.g., at axis of rotation 548) to provide the necessary movement required.

From the operating instructions for each drive unit, operating instructions for the individual motors of each drive unit are determined in 910 and 912, for the first and second drive units, respectively. Each drive unit may include a plurality of motors driving a plurality of wheels. The determination of operating instructions for each motor may allow the drive unit and the assembly to conform to the movement determined in 904 and the assembly operating instructions determined in 906. Accordingly, the drive wheels of the drive units of the drive assembly may be independently operated. In certain embodiments, instructions to operate the first drive unit may be communicated in 910 and instructions to operate the second drive unit may be communicated in 912. The motors of the drive units may be independently operated in 914, 916, 918, and 920, accordingly to the techniques described herein.

Based on operation of the motors, sensor data may continue to be received in 902, to allow for a determination of, for example, whether the autonomous cart is on a desired path as well as determination of additional instructions, including further operational instructions and/or operational instruction adjustments.

Individual operation of each drive wheel may allow for holonomic motion of the drive assembly (and, thus, the autonomous cart). Operation of the drive wheels may result in predictable movement of the drive assembly in linear translation, rotation, and/or in other different types of movement modes.

In various embodiments, the operations determined in 906-912 may be determined through, for example, a velocity command technique. That is, the x, y, and rotational velocity of the assembly may be determined based on the desired trajectory. Based on the x, y, and rotational velocity of the assembly, the x, y, and rotational velocity of each individual drive unit may be determined and individual motor operating instructions may be determined accordingly to achieve the x, y, and rotational velocity desired.

In another embodiment, the operations determined in 906-912 may be determined through a wrench technique. That is, forces in x and y and a torque (e.g., rotational torque) for the assembly may be determined based on the desired trajectory. Based on the forces and torque for the assembly, the forces and torque velocity of each individual drive unit and, accordingly, each individual motor may be determined accordingly.

In various embodiments, the frame of reference (e.g., x, y, and bearing) may be the same for the assembly or may be varied between the drive assembly and/or the various drive units. In certain embodiments, various portions of technique 900 may be determined by any controller of an autonomous cart. Thus, for example, a certain embodiment may perform 904, 906, and 908 with a controller of an assembly, while 910 and 912 may be performed by a controller of the respective drive units. Other embodiments may perform portions o the technique, such as 908, with other controllers (e.g., 908 may be performed by controllers of the drive units). Additional details for determining the operating instructions may be described in FIGS. 10A and 10B. Though FIGS. 10A and 10B describe operation from an example frame of reference, it is appreciated that additional frame of references are within the scope of this disclosure.

Figure 10A:
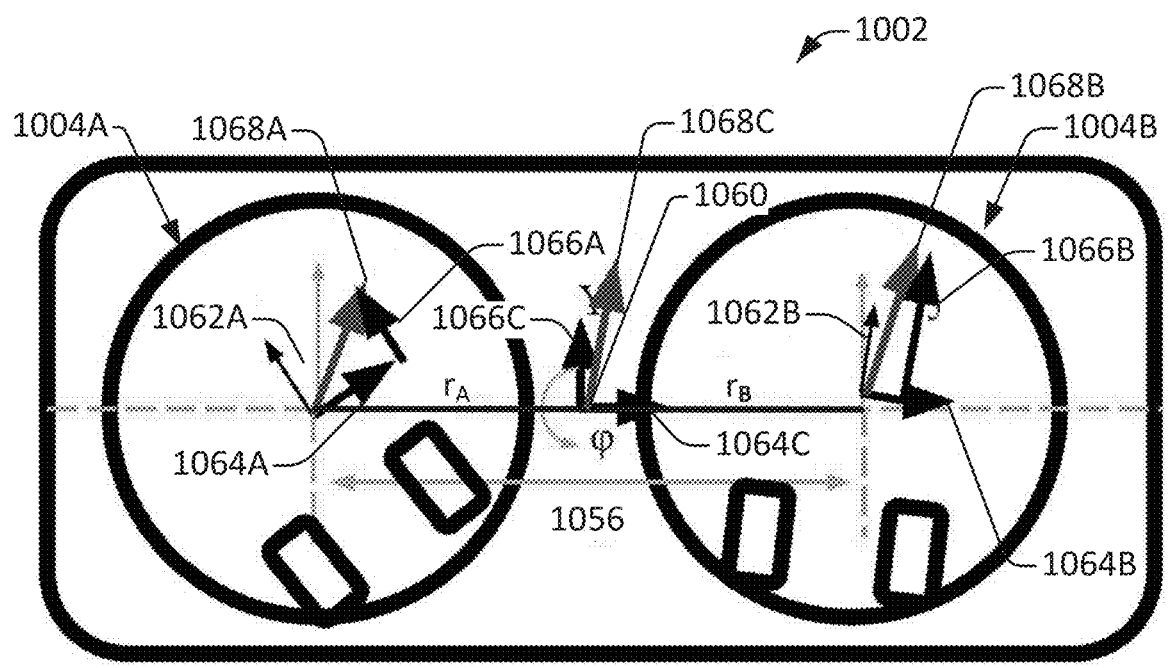
FIGS. 10A and 10B illustrate top views of presentations of examples of operations of a drive assembly and a drive unit, respectively, for an autonomous powered cart drive, configured in accordance with one or more embodiments.
Figure 10B:
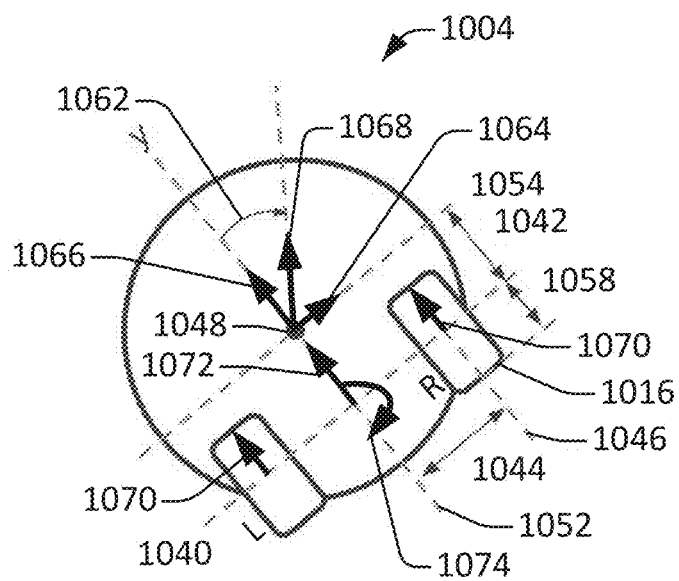

FIGS. 10A and 10B illustrate top views of presentations of examples of operations of a drive assembly and a drive unit, respectively, for an autonomous powered cart drive, configured in accordance with one or more embodiments. FIGS. 10A and 10B may illustrate techniques for modeling of the dynamics of autonomous robot 1000 (e.g., by a controller of autonomous robot 1000), to aid in the determination of operation instructions for drive assembly 1002 and the drive units 1004A and 1004B of drive assembly 1002. In various embodiments, the distances, torques, velocities, rotations, accelerations, dimensions, and orientations (e.g., theta 1062) may each be sensed by one or more sensors (e.g., accelerometers, torque sensors, positions sensors, cameras, and/or other such sensors) to provide the inputs for the determinations described herein.

FIG. 10A illustrates aspects of operation of drive assembly 1002 that includes a plurality of drive units 1004A and 1004B and FIG. 10B illustrates aspects of operation of an individual drive unit 1004 of drive assembly 1002. For the purposes of this disclosure, the drive units of drive assembly 1002 are denoted as drive units 1004A and 1004B to clearly identify the force aspect associated with each drive unit, but it is appreciated that disclosure provided for one drive unit may apply to the other drive unit, and vice versa. For simplicity, while the drive units of FIG. 10A are labeled with "A" and "B" for clarity, FIG. 10B describes a generic drive unit 1004. Thus, for the purposes of this disclosure, "A" and "B" are utilized to differentiate the two different drive units.

In the embodiment of FIGS. 10A and 10B, drive units 1004 of drive assembly 1002 may be modeled as modules of a single rigid body per drive unit and the payload associated with drive assembly 1002 as another rigid body. Accordingly, movement and/or forces experienced by the drive assembly and/or drive units may be determined from the perspective of a single point of the drive assembly and/or drive units.

Each drive unit 1004 may interact with the remainder of autonomous robot 1000 through axis of rotation 1048, which is the connection that each drive unit 1004 has with drive assembly 1002. For the purposes of modeling for determination of operation instructions, the mass of the payload of autonomous robot 100 may be approximated as evenly divided point masses located at axis of rotation 1048 of each drive unit 1004. Axis of rotation 1048 may be a free rotational joint coupling each drive unit 1004 to the remainder of drive assembly 1002. The difference in travel direction between the y-axis of the nominal frame of reference and the respective drive unit may be represented by angle theta 1062.

Accordingly, the system of drive assembly 1002 includes four actuators (the four powered drive wheels 1016, with two powered drive wheel on each drive unit 1002) for the three degrees of freedom (x, y, and θ) of autonomous robot 1000. There is a one degree of freedom constraint for the constant distance between drive units 1004, which is center to center distance 1056.

In certain embodiments, the controller(s) of autonomous robot 1000 may calculate and/or simulate the movement of each drive unit 1004 with a constraint between the two drive units 1004 to be a constant distance from center 1060. In certain embodiments, the constrained distance between drive units 1004 may nonetheless be acted upon as a control factor (e.g., to impart stability by providing for pushing forces at each end of the constrained distance).

In various embodiments, operational aspects for movement of the autonomous cart around a global point (e.g., the center of drive assembly 1002 or another such point, which may be any possible point including points that are not located on the autonomous cart) may first be determined. Based on the operational aspect for the global point, the target for operation of each drive unit may be determined. Operation of each individual motor of the drive unit may then be determined.

For example, for the velocity command technique, a controller may determine that a desired trajectory results in drive assembly 1002 requiring a velocity $\vec{V}$ along vector 1068C around center 1060 of drive assembly 1002. Velocity $\vec{V}$ along vector 1068C may include component velocities $V_x$ along vector 1064C and $V_y$ along vector 1066C in the x and y direction, respectively, of drive assembly 1002. Drive assembly 1002 may further include a rotational velocity φ. Accordingly, drive assembly 1002 includes a target linear velocity $\vec{V}$ and target rotational velocity φ.

The resultant velocities at each drive unit 1004 may be determined through:

$$V_A = \vec{V} + \varphi * (\vec{rA})$$

$$V_B = \vec{V} + \varphi * (\vec{rB})$$

$V_A$ and $V_B$ may then be converted into the frame of reference of the respective drive unit M through (where θ is the value of theta 1062):

$$V_{xM} = V_x * \cos \theta_M - V_y * \sin \theta_M$$

$$V_{yM} = V_x * \sin \theta_M + V_y * \cos \theta_M$$

The velocities for each wheel of the drive unit may then be determined by:

$$V_{LM} = V_{xM} + V_{yM} * \frac{(\text{distance of } 1044)}{2 * (\text{distance of } 1042)}$$

$$V_{RM} = V_{yM} + V_{xM} * \frac{(\text{distance of } 1044)}{2 * (\text{distance of } 1042)}$$

Rotational velocities required for each motor may be determined by dividing the respective wheel velocity by the respective wheel radius (e.g., 1058) to arrive at the target rotational velocity for each motor.

For the wrench technique, a controller may determine that a desired trajectory of drive assembly 1002 requires a linear force F and a wrench force φ around center 1060 of drive assembly 1002. To provide the required linear force and wrench force, equivalent linear forces for each drive unit are determined:

$$F_A = \frac{1}{2}\vec{F} + \frac{1}{2} * \varphi * (\vec{rA})$$

-continued $$F_B = \frac{1}{2}\vec{F} + \frac{1}{2} * \varphi * (\vec{rB})$$

Of note, no wrench force is calculated for each drive unit as the drive units are allowed to freely rotate.

$F_A$ and $F_B$ may then be converted into the frame of reference of the respective drive unit M through (where θ is the value of theta 1062):

$$F_{xM} = F_x * \cos\theta_M - F_y * \sin\theta_M$$

$$F_{yM} = F_x * \sin\theta_M + F_y * \cos\theta_M$$

The wheel torque required for each wheel of the drive unit may then be determined by:

$$F_{LM} = \frac{1}{2}F_{xM} - F_{yM} * \frac{\text{(distance of 1042)}}{\text{(distance of 1044)}}$$

$$F_{RM} = \frac{1}{2}F_{xM} + F_{yM} * \frac{\text{(distance of 1042)}}{\text{(distance of 1044)}}$$

Torque required for each motor may be determined by dividing the respective wheel torque by the respective wheel radius (e.g., 1058) to arrive at the target torque output for each motor. Outputs of motor torque values that exceed the torque limits of the motors may be recalculated by limiting the accelerations of each drive wheel to the max torque value of the motor, with the resulting motion modified appropriately.

In certain embodiments, Jacobians may be utilized to transform actuator (e.g., motor) velocities to global (e.g., global coordinate) velocities. For the purposes of the transformation, a=1044, b=1042, c=cos(1062), s=sin(1062), and r=1058. The Jacobian on the drive unit state θ (e.g., from the frame of reference at θ) may be expressed as:

$$J = \frac{r}{2a}\begin{bmatrix} -1 & 1 & 0 & 0 \\ 0 & 0 & -1 & 1 \end{bmatrix}$$

The Jacobian for external states, such as an external frame of reference may be expressed as:

$$J = \frac{r}{4a}\begin{bmatrix} -bc1-as1 & bc1-as1 & -bc2-as2 & bc2-as2 \\ -bs1+ac1 & bs1+ac1 & -ba2+ac2 & ba2+ac2 \\ bs3-ac3 & -bs3-ac3 & -bs4+ac4 & bs4+ac4 \\ d/2 & d/2 & d/2 & d/2 \end{bmatrix}$$

External states may be utilized to allowed for determination of movement of the drive assembly around different axes of rotation.

Controller Example

Figure 11:
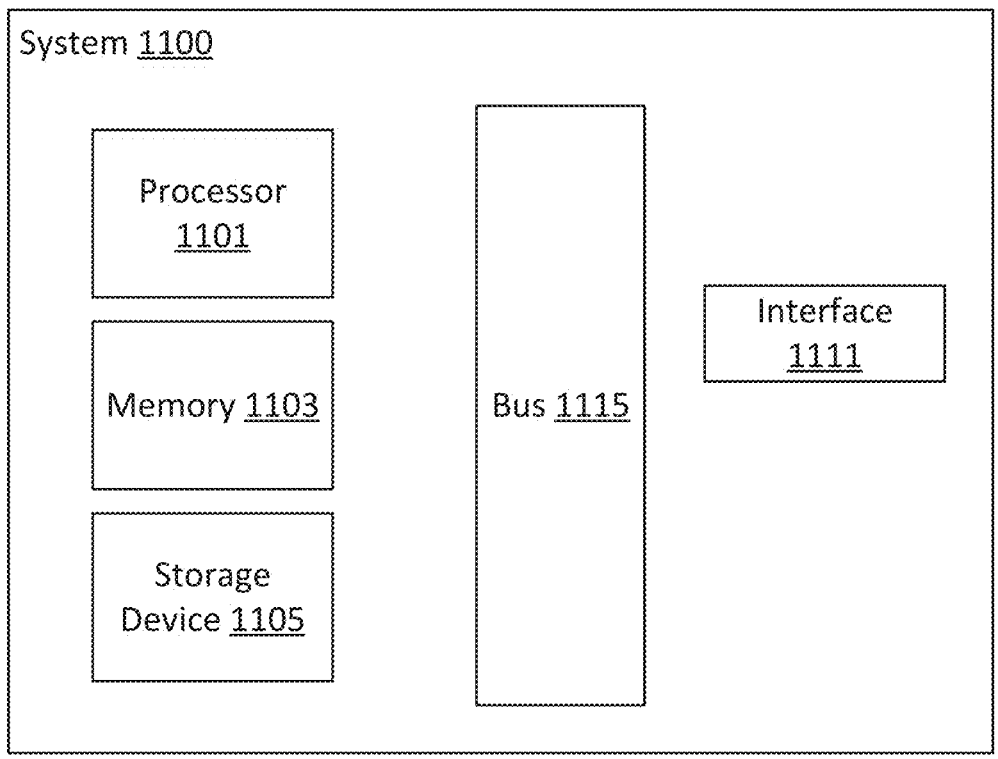
FIG. 11 is a block diagram of a computing device, configured in accordance with one or more embodiments.

FIG. 11 is a block diagram of a computing device, configured in accordance with one or more embodiments. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as a variety of devices such as cleaning robot, remote server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

Drive Assembly Movement Example

Figure 12:
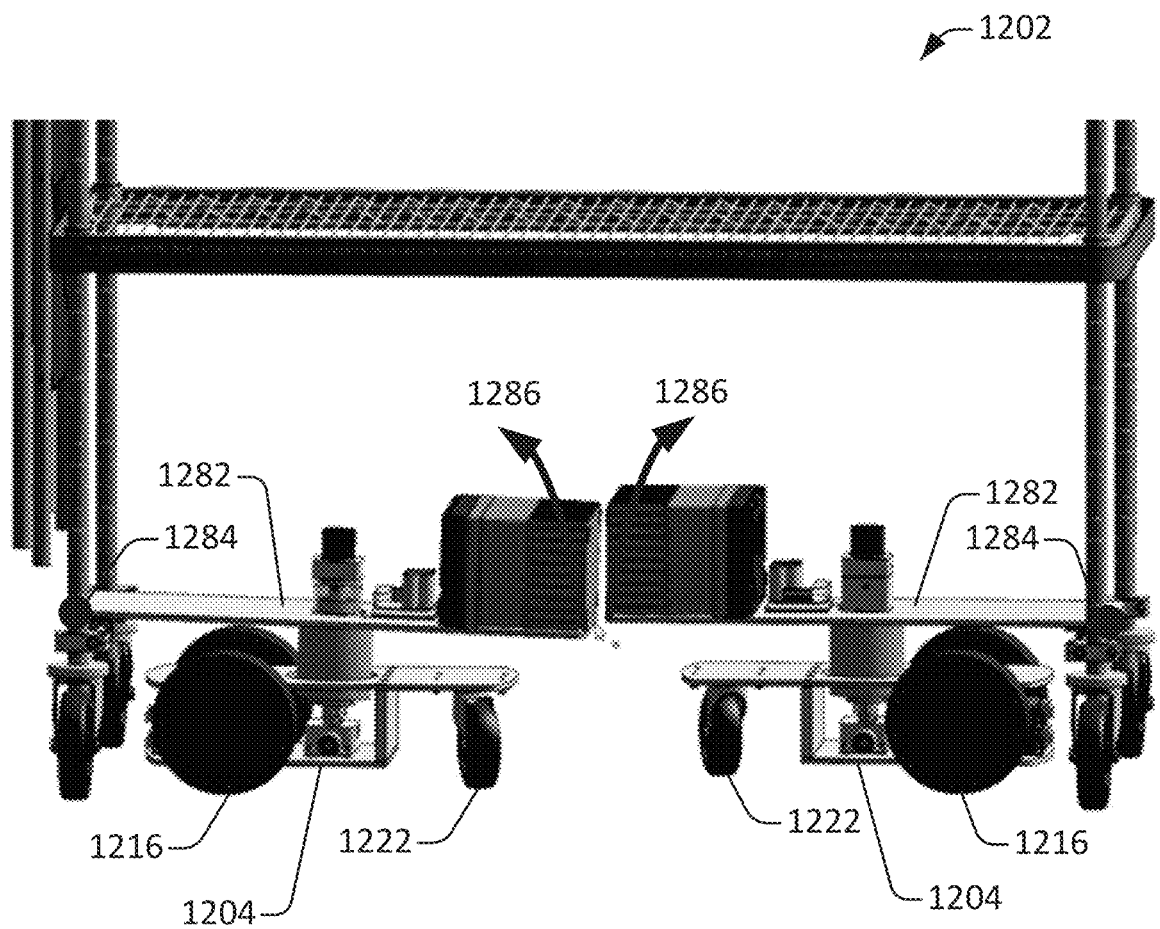
FIG. 12 illustrates a side view of a drive assembly, configured in accordance with one or more embodiments.

FIG. 12 illustrates a side view of a drive assembly, configured in accordance with one or more embodiments. FIG. 12 illustrates drive assembly 1202 that includes a plurality of drive units 1204. Each drive unit 1204 may include a plurality of drive wheels 1216 and drive unit support 1222, which may be a castor. Each drive unit 1204 may be coupled to drive unit mount 1282. Drive unit mount 1282 may be coupled to other portions of drive assembly 1202 (e.g., drive assembly enclosure 210) and/or to payload 108. Drive unit mount 1282 allows for its associated drive unit 1204 to move in response to undulations of the surface that the associated drive unit 1204 is traveling over and, thus, respond to changes in ground clearance between autonomous robot 100 and the terrain.

For example, each drive unit mount 1282 may be coupled to point 1284. In certain embodiments, drive unit mount 1282 may be a plate, link, frame, or other structure. Point 1284 may be a hinge, fixed mount (e.g., point 1284 may be configured to not allow movement and, instead, drive unit mount 1282 may be configured to flex around point 1284 due to compliance characteristics of the structure of drive unit mount 1282), suspended mount (e.g., may include its own suspension that allows for movement across one or more degrees of freedom and may include springing elements, damping elements, and/or control elements such as arms and hinges). In the example of FIG. 12, point 1284 may be a hinge and drive unit mount 1282 (and thus, drive unit 1204 coupled to drive unit mount 1282) may be configured to rotate around hinge 1284 in direction 1286. Such a configuration may allow for each individual drive unit 1204 to independently react to surface undulations.

In certain embodiments, additional or alternative suspending elements for drive assembly 1202 may be utilized. Thus, for example, drive assembly 1202 may include suspension and/or damping elements for the entire assembly (e.g., where it couples to payload 108) that may allow for movement and may damp such movement.

Figure 13A:
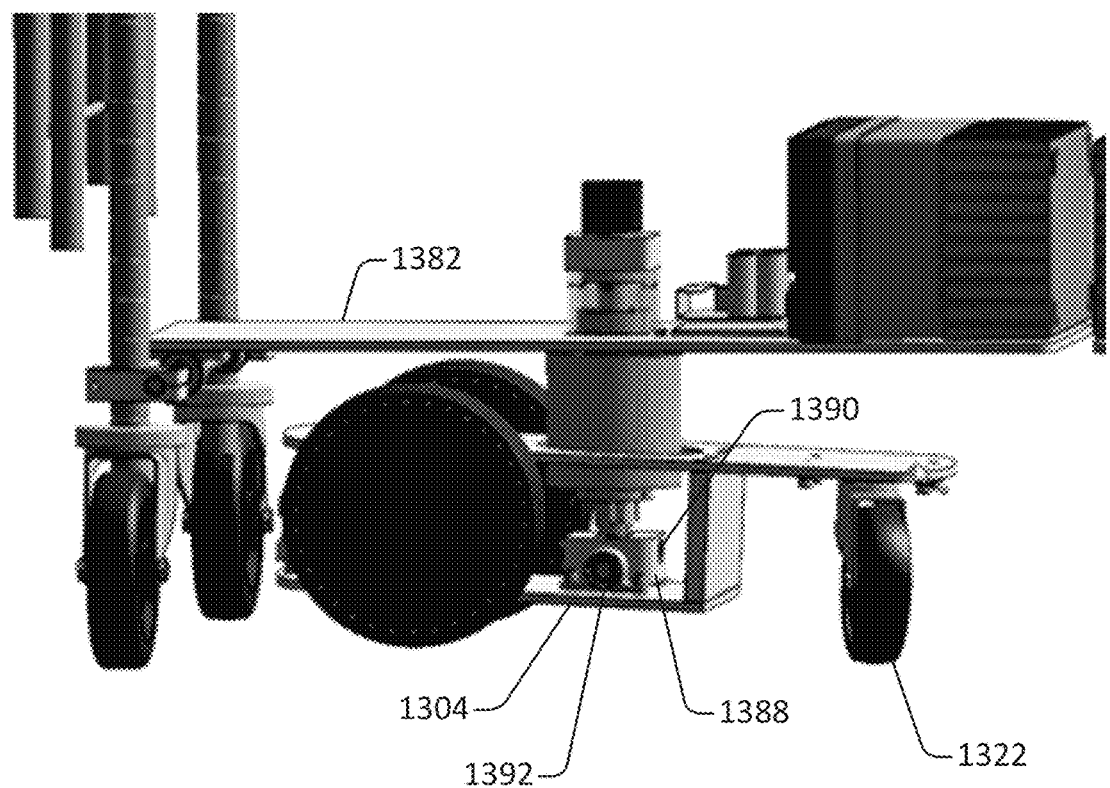
FIGS. 13A and 13B illustrate perspective views of drive units, configured in accordance with one or more embodiments.
Figure 13B:
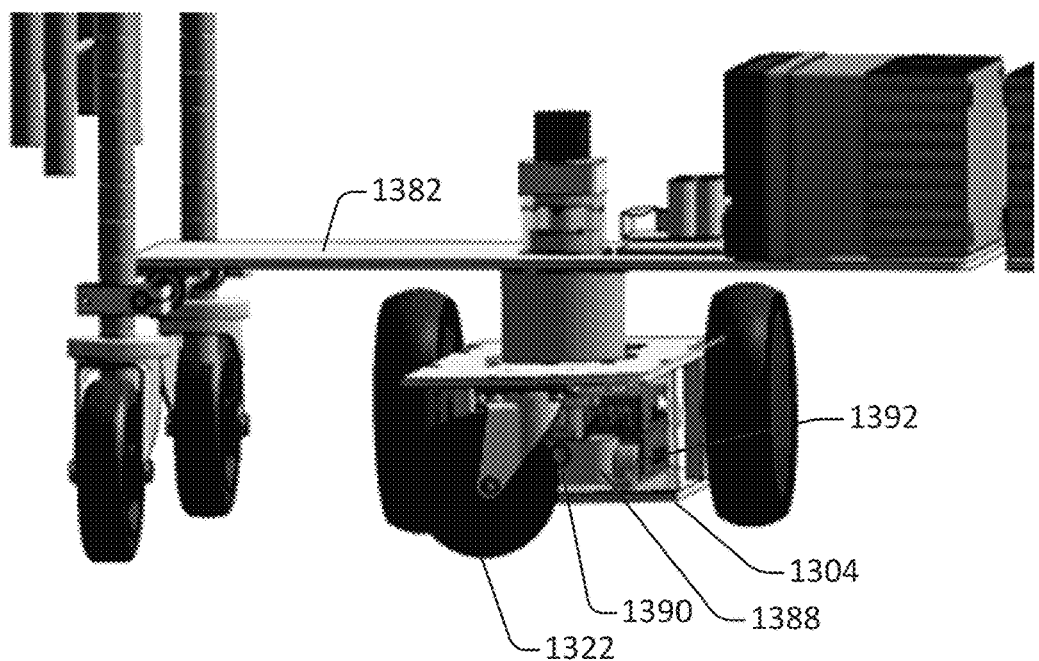

FIGS. 13A and 13B illustrate perspective views of drive units, configured in accordance with one or more embodiments. FIGS. 13A and 13B both illustrate drive unit 1304 with drive unit mount 1382. As shown, drive unit 1304 includes gimbal 1388. Gimbal 1388 includes first bearing 1390 and second bearing 1392, which may allow for drive unit 1304 to move (e.g., translate and/or rotate in pitch and roll) in response to surface undulations and/or dynamic movements of autonomous robot 100, independent of movement of drive unit mount 1382. First bearing 1390 and second bearing 1392 may be configured to allow for movement along different axes (e.g., first bearing 1390 may be configured to allow for rotation of drive unit 1304 around a first axis and second bearing 1392 may be configured to allow for rotation of drive unit 1304 around a second axis). In various other embodiments, gimbal 1388 may include one or more additional or fewer bearings, links, and/or other such elements that allow for movement in one or more degrees of freedom, independent of drive unit mount 1382.

In various embodiments, the configuration of FIGS. 12, 13A, and 13B may allow for portions of drive assembly 1202, or all of drive assembly 1202, to rise, fall, or other conform with uneven terrain or handling dynamics. Furthermore, the configuration of FIGS. 12, 13A, and 13B may reduce tipping hazards for drive assembly 1202 and, thus, for autonomous robot 100, as well as allow for controlled movement over uneven terrain. The configuration illustrated in FIGS. 12, 13A, and 13B may, for example, allow for gimbal-like degrees of freedom between drive assembly 102 and payload 108 in response to uneven terrain.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of industrial autonomous mobile robots configured for operation in a warehouse setting. However, the techniques of the present invention apply to a wide variety of autonomous mobile robots configured for operation in a wide variety of settings. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A robot drive assembly comprising:
a drive assembly enclosure;
a plurality of robot drive units, each of the robot drive units comprising:
a chassis;
a first driven wheel, configured to rotate about a first axle centerline, and a second driven wheel, configured to rotate about a second axle centerline, wherein each of the first and second driven wheels are coupled to the chassis and disposed in a fixed orientation relative to the chassis;
a first motor, configured to drive the first driven wheel, and a second motor, configured to drive the second driven wheel; and
an unpowered drive unit coupling, configured to interface with a portion of the drive assembly enclosure to allow the respective robot drive unit to rotate relative to the drive assembly enclosure, wherein the unpowered drive unit coupling is configured to allow the chassis to freely rotate in an unpowered manner about an unpowered axis of rotation relative to the drive assembly enclosure, wherein the unpowered axis of rotation is disposed a first distance from the first axle centerline along a travel axis corresponding to a nominal direction of travel of the first driven wheel, and wherein the first distance is a non-zero distance; and
a robot drive controller, configured to determine operating instructions and provide the operating instructions to each of the plurality of robot drive units, wherein the determining the operating instructions comprise:
determining robot drive assembly operating instructions based on a desired movement for the robot drive assembly;
determining drive unit instructions for each of the plurality of robot drive units based on the robot drive assembly operating instructions; and
determining first motor operating instructions for the first motor based on the drive unit instructions, wherein the first motor operating instructions comprise a first target motor velocity or torque, determined based on the first distance.

2. The robot drive assembly of claim 1, wherein the first axle centerline and the second axle centerline are colinear.

3. The robot drive assembly of claim 1, wherein the drive assembly enclosure comprises a payload coupling configured to couple to a payload.

4. The robot drive assembly of claim 1, wherein the unpowered axis of rotation is disposed a second distance from the second axle centerline, and wherein the robot drive controller comprises:
an assembly controller, coupled to the drive assembly enclosure; and
a plurality of unit controllers, each unit controller disposed within each one of the robot drive units and configured to determine the first motor operating instructions and second motor operating instructions for the second motor, wherein the second motor operating instructions comprise a second target motor velocity or torque determined based on the second distance.

5. The robot drive assembly of claim 4, wherein the assembly controller is configured to determine the robot drive assembly operating instructions and the drive unit instructions for each of the plurality of robot drive units and provide the drive unit instructions to each of the respective unit controllers.

6. The robot drive assembly of claim 5, wherein each of the robot drive units further comprise an angular position sensor, configured to determine an orientation of the respective robot drive unit to the drive assembly enclosure.

7. The robot drive assembly of claim 6, wherein:
the determining the robot drive assembly operating instructions comprises obtaining a target linear velocity and a target rotational velocity for a first point associated with the robot drive assembly;
the determining the drive unit instructions for each of the plurality of robot drive units comprises converting the target linear velocity and the target rotational velocity to a module linear velocity for the respective robot drive unit, wherein the module linear velocity is for a second point associated with the respective robot drive unit;
the first target motor velocity or torque comprises a first motor velocity target determined based further on the module linear velocity and the orientation;
the second target motor velocity or torque comprises a second motor velocity target determined based further on the module linear velocity and the orientation; and
each of the unit controllers is further configured to communicate the first and second motor velocity targets to each of the respective motors.

8. The robot drive assembly of claim 7, wherein the second point is located within the drive unit coupling.

9. The robot drive assembly of claim 6, wherein:
the determining the robot drive operating instructions comprises obtaining a target linear force and a target wrench for a first point associated with the robot drive assembly;
the determining the drive unit instructions for each of the plurality of robot drive units comprises converting the target linear force and the target wrench to a module linear force for the respective robot drive unit, wherein the module linear force is for a second point associated with the respective robot drive unit;
the first target motor velocity or torque comprises a first motor torque target determined based further on the module linear force and the orientation;
the second target motor velocity or torque comprises a second motor torque target determined based further on the module linear force and the orientation; and
each of the unit controllers is further configured to communicate the first and second motor torque targets to each of the respective motors.

10. The robot drive assembly of claim 1, wherein the first drive wheel is laterally offset from the unpowered drive unit coupling by a first lateral distance, and wherein the first target motor velocity or torque is further determined based on the first lateral distance.

11. A robot drive unit comprising:
a chassis;
a first driven wheel, configured to rotate about a first axle centerline and a second driven wheel, configured to rotate about a second axle centerline, wherein each of the first and second driven wheels are coupled to the chassis and disposed in a fixed orientation relative to the chassis;
a first motor, configured to drive the first driven wheel, and a second motor, configured to drive the second driven wheel;
an unpowered drive unit coupling, configured to interface with a portion of a robot drive assembly to allow the robot drive unit to rotate relative to the portion of the robot drive assembly, wherein the unpowered drive unit coupling is configured to allow the chassis to freely rotate in an unpowered manner about an unpowered axis of rotation relative to the portion of the robot drive assembly, wherein the unpowered axis of rotation is disposed a first distance from the first axle centerline along a travel axis corresponding to a nominal direction of travel of the first driven wheel, and wherein the first distance is a non-zero distance; and
a drive unit controller, configured to determine first motor operating instructions comprising a first target wheel velocity or torque, determined based on the first distance.

12. The robot drive unit of claim 11, wherein the drive unit coupling is configured to couple to one of a plurality of assembly couplings of the robot drive assembly.

13. The robot drive unit of claim 12, wherein the robot drive unit is configured to operate in conjunction with one or more other robot drive units coupled to the robot drive assembly.

14. The robot drive unit of claim 11,
wherein the first motor operating instructions are determined based on drive unit instructions.

15. The robot drive unit of claim 14, wherein
the drive unit instructions are received from an assembly controller associated with the robot drive assembly.

16. The robot drive unit of claim 15, further comprising the assembly controller, wherein the assembly controller is configured to determine drive unit instructions for the robot drive unit, and wherein the determining the drive unit instructions comprises:
obtaining a target linear velocity and a target rotational velocity for a first point associated with the robot drive assembly;
converting the target linear velocity and the target rotational velocity to a module linear velocity, wherein the module linear velocity is for a second point associated with the robot drive unit; and
communicating the module linear velocity to the drive unit controller.

17. The robot drive unit of claim 16, wherein the second point is located within the drive unit coupling.

18. The robot drive unit of claim 15, further comprising the assembly controller, wherein the assembly controller is configured to determine drive unit instructions for the robot drive unit, and wherein the determining the drive unit instructions comprises:
obtaining a target linear force and a target wrench for a first point associated with the robot drive assembly;
converting the target linear force and the target wrench to a module linear force, wherein the module linear force is for a second point associated with the robot drive unit; and
communicating the module linear force to the drive unit controller.

19. The robot drive unit of claim 11, wherein the unpowered axis of rotation is disposed a second distance from the second axle centerline, and wherein drive unit controller is further configured to determine second motor operating instructions comprising a second target wheel velocity or torque, determined based on the second distance.

20. The robot drive unit of claim 19, wherein the first axle centerline and the second axle centerline are colinear.

* * * * *